US008660503B2

(12) United States Patent
Kaukovuori et al.

(10) Patent No.: US 8,660,503 B2
(45) Date of Patent: Feb. 25, 2014

(54) TRANSMITTER

(71) Applicant: Renesas Mobile Corporation, Tokyo (JP)

(72) Inventors: Jouni Kristian Kaukovuori, Vantaa (FI); Petri Tapani Eloranta, Espoo (FI); Risto Kaunisto, Espoo (FI); Aarno Tapio Pärssinen, Espoo (FI); Antti Oskari Immonen, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/651,906

(22) Filed: Oct. 15, 2012

(65) Prior Publication Data

US 2013/0244599 A1 Sep. 19, 2013

(30) Foreign Application Priority Data

Mar. 14, 2012 (GB) .................................. 1204515.9

(51) Int. Cl.
*H04B 1/66* (2006.01)
(52) U.S. Cl.
USPC ..... 455/102; 455/103; 455/114.1; 455/114.2; 455/115.3
(58) Field of Classification Search
USPC .................... 455/551, 552.1, 553.1, 91–129
See application file for complete search history.

(56) References Cited

U.S. PATENT DOCUMENTS

| | | | | |
|---|---|---|---|---|
| 5,307,515 A | * | 4/1994 | Kuo et al. ...................... 455/295 |
| 5,867,786 A | * | 2/1999 | Ishi ............................... 455/436 |
| 5,983,081 A | * | 11/1999 | Lehtinen ......................... 455/76 |
| 7,088,960 B2 | * | 8/2006 | Kato et al. ...................... 455/69 |
| 7,363,008 B2 | * | 4/2008 | Hassan et al. ................. 455/63.1 |
| 7,613,224 B2 | * | 11/2009 | Hammes et al. ............... 375/133 |
| 7,983,222 B2 | * | 7/2011 | Giaimo et al. ................. 370/332 |
| 8,134,453 B2 | * | 3/2012 | Ootsuka ....................... 340/12.22 |
| 8,326,294 B2 | * | 12/2012 | Narang et al. ................. 455/434 |
| 8,396,003 B2 | * | 3/2013 | Leinonen et al. .............. 370/252 |
| 2005/0008064 A1 | * | 1/2005 | Hammes et al. ............... 375/131 |
| 2007/0047669 A1 | | 3/2007 | Mak et al. |

(Continued)

FOREIGN PATENT DOCUMENTS

WO WO 2004/062087 A1 7/2004
WO WO 2010/129584 A1 11/2010

OTHER PUBLICATIONS

Search Report under Section 17 dated Jul. 12, 2012 which is issued in a related British Application No. GB1204515.9 (4 pages).
Nokia Corporation, etc., RP-110732, "Update to LTE Carrier Aggregation Enhancements WID," TSG RAN Meeting #52, Bratislava, Slovakia, May 31-Jun. 3, 2011 (16 pages).

(Continued)

*Primary Examiner* — Edward Urban
*Assistant Examiner* — Rui Hu
(74) *Attorney, Agent, or Firm* — Lucas & Mercanti LLP; Robert P. Michal

(57) ABSTRACT

Embodiments provide a transmitter and a method for transmitting data via a combination of a first signal modulated at a first carrier frequency, and a second signal modulated at a second carrier frequency, different to the first carrier frequency. In one embodiment the transmitter includes a local oscillator and is configured to adaptively configure the local oscillator to operate at a first local oscillator frequency and an alternative local oscillator frequency, different to the first frequency, in dependence on a required signal strength of the first signal relative to a required signal strength of the second signal.

32 Claims, 20 Drawing Sheets

(56) References Cited

U.S. PATENT DOCUMENTS

| | | |
|---|---|---|
| 2008/0057996 A1* | 3/2008 | Sung et al. .................... 455/522 |
| 2009/0130978 A1* | 5/2009 | King et al. ...................... 455/62 |
| 2009/0239489 A1 | 9/2009 | Kaczman et al. |
| 2010/0015967 A1* | 1/2010 | Perets et al. ............... 455/422.1 |
| 2010/0142592 A1* | 6/2010 | Blanchard et al. ............ 375/146 |
| 2012/0135738 A1* | 5/2012 | Yoshihara et al. ............ 455/436 |
| 2012/0329515 A1* | 12/2012 | Husted et al. .............. 455/552.1 |
| 2013/0045704 A1* | 2/2013 | Kaukovuori et al. ......... 455/255 |

OTHER PUBLICATIONS

Rapeepat Ratasuk, et al., "Carrier Aggregatopm in LTE-Advanced," 2010 IEEE Vehicular Technology Conference (VTC 2010—Spring), May 16-19, 2010, pp. 1-5 XP031696127.

PCT International Search Report mailed Sep. 4, 2013 which were issued in a related PCT International Application No. PCT/IB2013/052027 (3 pages).

* cited by examiner

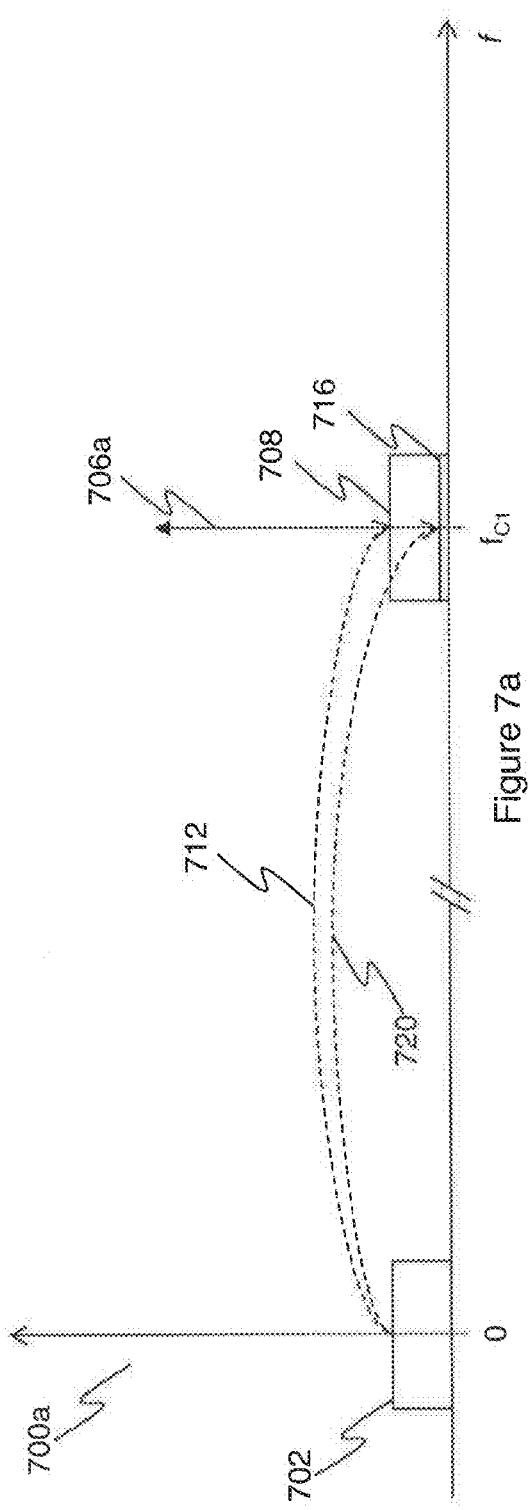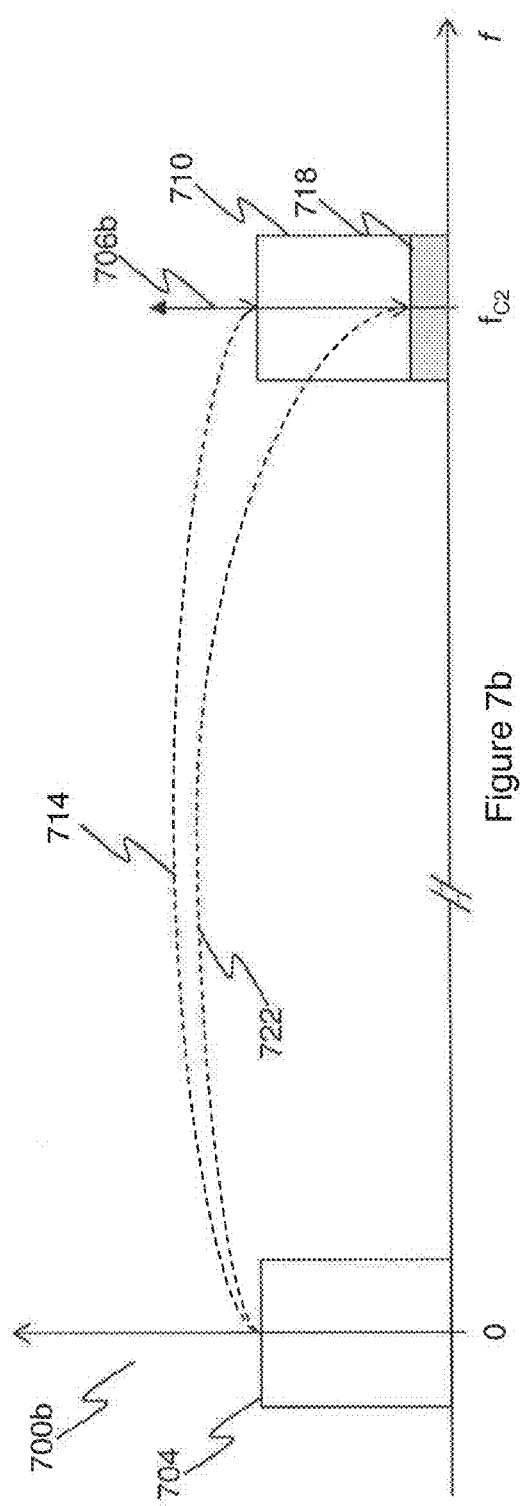

TRANSMITTER

This application claims the benefit under 35 U.S.C. §119 (a) and 37 CFR 1.55 to UK Patent Application No. 120451.5.9, filed on Mar. 14, 2012, the entire content of which is hereby incorporated by reference.

TECHNICAL FIELD

Embodiments described herein relate, to transmitters for radio communication systems, and in particular to transmitters for use with contiguous carrier aggregation schemes.

BACKGROUND

Long Term Evolution (LTE) Advanced is a mobile telecommunication standard proposed by the 3rd Generation Partnership Project (3GPP) and first standardised in 3GPP Release 10. In order to provide the peak bandwidth requirements of a 4th Generation system as defined by the International Telecommunication Union Radiocommunication (ITU-R) Sector, while maintaining compatibility with legacy mobile communication equipment, LIE Advanced proposes the aggregation of multiple carrier signals in order to provide a higher aggregate bandwidth than would be available if transmitting via a single carrier signal. This technique of Carrier Aggregation (CA) requires the original data to be split into multiple data streams, which are modulated separately onto a number of carrier signals. Each of the signals are then demodulated at the receiver, whereafter the message data from each of the signals can be combined in order to reconstruct the original data. Carrier Aggregation can be used also in other radio communication protocols such as High Speed packet Access (HSPA).

FIG. 1 illustrates two main variations of CA on frequency-amplitude graph 100. The graph areas 102, 104, 106 and 108 are representative of signals modulated at carrier frequencies $f_{C1}$, $f_{C2}$, $f_{C3}$ and $f_{C4}$ respectively. Carrier frequencies $f_{C1}$, $f_{C2}$, $f_{C3}$ and $f_{C4}$ are associated with a set of adjacent channels used in a communication scheme, such as LTE, which has been assigned for use in the displayed section of the frequency spectrum. Each communication channel may be separated by guard bands, which are unused sections of the frequency spectrum designed to improve the ease with which individual signals can be selected by filters at the receiver and reduce the likelihood of interference between signals transmitted in adjacent channels.

In a first communication instance, data is transmitted using the aggregation of signals 102 and 104 modulated at carrier frequencies $f_{C1}$ and $f_{C2}$ respectively. This is an example of contiguous CA, where data is transmitted at carrier frequencies that are adjacent in the frequency spectrum. In a second communication instance, data is transmitted using the aggregation of signals 106 and 108 modulated at carrier frequencies $f_{C3}$ and $f_{C4}$ respectively. This is an example of non-contiguous CA, where data is transmitted at carrier frequencies that are separated by one or more intermediate carrier frequencies (in this case $f_{C1}$ and $f_{C2}$) not used in the communication instance. In some non-contiguous CA arrangements, the aggregated signals may be in entirely different frequency bands.

Several radio communication schemes, including LTE, use quadrature modulation to increase the data density of a single frequency channel by transmitting a second message which is modulated with a carrier that is 90° out of phase with respect to a first message. These two message components are termed the in-phase (I) and quadrature (Q) components respectively.

A common method for generating a quadrature modulated signal uses a transmitter arrangement known as a Direct Conversion Transmitter (DCT).

FIG. 2 illustrates a schematic diagram of an exemplary DCT as known in the art. The original data is first split into two message streams, which are used to generate the desired I and Q signals 202 and 204 in the digital domain. Digital to analogue converters (DACs) 206 and 208 convert the binary representations of the I and Q message data into baseband I and Q signals. The desired I and Q components are isolated using low pass filters 210 and 212 respectively, which are used to suppress unwanted frequencies, such as harmonics or artefacts associated with the conversion process generated outside of the intended frequency range.

In order to achieve the required frequency up-conversion, mixers 214 and 216 perform multiplication between the input signal and a locally generated signal of the required carrier frequency, generated by local oscillator 218. In order to uniquely modulate both the I and Q components, the baseband signal must be mixed with both in-phase and quadrature shifted versions of the local oscillator signal, which are generated by quadrature generator 220. The I component of the signal is mixed with the in-phase local oscillator signal by mixer 214, and the Q component of the signal is mixed with the quadrature phase local oscillator signal by mixer 216.

The two up-converted signals are then summed at radio frequency at summing point 222. The summed signal is them amplified by power amplifier 224 to a level suitable for transmission. As antenna 228 is typically shared with other hardware, such as corresponding receiver circuitry, a band pass filter 226 (commonly referred to as the duplex filter) is typically deployed. This prevents signal power from the transmitted signals from leaking into the antenna at frequencies to which the receiver is sensitive. Finally, the combined radio frequency signal is emitted via antenna 228.

With minimal modification, a DCT can also be used to transmit a contiguous CA signal, i.e. one which involves the aggregation of two adjacent frequency channels. Signals 102 and 104 of FIG. 1 are an example of CA according to such a configuration. One type of contiguous CA scheme is defined in 3GPP TR 36.807 as Carrier Aggregation bandwidth class C.

FIG. 3 illustrates the operation of conventional DCT hardware when used to transmit data via two adjacent signals on frequency-amplitude graph 300. Signals 302 and 304 are synthesised in the digital domain centred on frequencies at plus and minus half the required channel separation distance ($f_{SEP}$) of the CA signals. Here and subsequently, the negative portion of the frequency axis is used to indicate a 180° phase shift, as is common convention. Mixing a signal having frequency f with a local oscillator signal of frequency $f_{LO}$ has the effect of translating the signal to be centred on new frequencies at $f_{LO}$−f and $f_{LO}$+f. However, careful construction of the signals in the digital domain allows controlled up-conversion to only one of these frequencies. The following description utilises the convention where the negative frequency signal is translated to the lower frequency carrier and the positive frequency signal is translated to the higher frequency carrier. An alternative convention is to invert this relationship.

After digital to analogue conversion, mixing the synthesised signals 302 and 304 with local oscillator signal 306 having a frequency halfway between the required carrier frequencies ($f_{C1}$ and $f_{C2}$), results in frequency up-conversion of signals 302 and 304. Signal 302 is translated to be centred on frequency $f_{LO}−½f_{SEP}$ (i.e. $f_{C1}$) as shown by translated signal 308 and arrow 312. Signal 304 is translated to be centred on frequency $f_{LO}+½f_{SEP}$ (i.e. $f_{C2}$) as shown by translated signal 310 and arrow 314. Under this arrangement the DCT hardware acts as a low intermediate frequency (IF) transmitter for both carriers.

Unfortunately, due to imperfections in the transmitter hardware (such as component mismatch, filter quality, quadrature signal phase quality etc.), the I and Q branches of a real transmitter will have finite amplitude and phase balance. As a result, some of the carrier power of each signal leaks into the other side. This is conventionally, conceptually represented as an image signal "folded" around the local oscillator frequency.

FIG. 4 shows the effect of these imperfections on the transmitted signals on frequency-amplitude graph 400. Again, signals 402 and 404 are frequency up-converted by mixing them with local oscillator signal 406. Due to the hardware imperfections discussed previously, the up-conversion process not only results in a translation of each signal to $f_{LO}+f$; more particularly, it also generates image signals at $f_{LO}-f$ which are folded around the local oscillator frequency and have a smaller but proportional magnitude. Mixing signal 402 with local oscillator signal 406 therefore results in a translation to signal 408 as shown by arrow 412, as well as the generation of image signal 416 as shown by arrow 420. Likewise, mixing signal 404 with local oscillator signal 406 results in a translation to signal 410 as shown by arrow 414, as well as the generation of image signal 418, as shown by arrow 422.

Hence, the up-conversion process results in the generation of an image signal over each of the carrier signals, with a magnitude that is proportional to that of the other carrier signal. Functioning DCTs are designed with a finite Image Reject Ratio (IRR) that is sufficient to reject images of this proportional magnitude. However, problems arise when the required signal strengths of the two carrier signals are substantially different. This could occur for several reasons. For example, due to the different propagation characteristics of the different frequency carrier signals, one carrier signal may become more attenuated on route to the intended recipient, and hence require transmission with greater signal strength. Additionally, one of the carrier signals could be augmented through the provisioning of frequency selective repeaters, thereby lowering the required signal strength of one signal relative to the other. Further, different carrier frequencies may be associated with different cell coverage areas or different transmitter directivity.

Each path between the transmitter and an intended recipient will have an associated propagation delay, which describes the amount of time required for a signal to travel along the path. In order to properly schedule the receipt of the carrier signal at the recipient, a time advance parameter is commonly used to determine when to begin the transmission of a given carrier signal. When transmitting more than one carrier signal, a multiple time advance parameter can be employed in order to configure the time advance of each carrier signal independently. As a result, the two carrier signals may be transmitted with an offset in the time domain. The use of a multiple time advance parameter thus enables the transmission of carrier signals which follow different propagation paths to their intended recipient, including the transmission of carrier signals to different recipients entirely. When the two carrier signals have different propagation paths to their intended recipient, it is likely that the propagation paths will have different associated attenuation characteristics. In order to enable successfully transmit the tow carrier signals under such conditions, the two signals may be required to be transmitted with different signal strengths.

FIG. 5 illustrates the operation of conventional DCT hardware when used to transmit data via two adjacent signals requiring a relative signal strength imbalance on frequency amplitude graph 500. In this scenario, the signal strength required for signal 508 (i.e. the carrier signal at $f_{C_1}$) is significantly lower than the signal strength required for signal 510 (i.e. the carrier signal at $f_{C_2}$). This is achieved by generating signal 502 with a proportionally smaller amplitude than signal 504. Again, signals 502 and 504 are frequency up-converted by mixing them with local oscillator signal 506. Mixing signal 502 with local oscillator signal 506 results in a translation to signal 508 as shown by arrow 512, as well as the generation of image signal 516 as shown by arrow 520. Likewise, mixing signal 404 with local oscillator signal 406 results in a translation to signal 410 as shown by arrow 414, as well as the generation of image signal 418 as shown by arrow 422. Unlike the previous example, where there was no signal strength imbalance between the transmitted carriers, there is now a large image (generated by the more powerful carrier signal) over the less powerful carrier signal, and a small image (generated by the less powerful carrier signal) over the more powerful carrier signal.

In the case of the carrier signal at $f_{C_1}$, the overlapping image signal now has a much larger proportional magnitude which the finite IRR of the transmitter may not be capable of suppressing. If this is the case then the image signal will significantly deteriorate the constellation and error-vector magnitude of the weaker carrier. As the required signal strength imbalance increases, the greater this effect becomes, and hence higher I-Q performance/IRR is required for reliable operation. Hence there is a finite limit to the signal strength imbalance between two contiguous CA carriers that can be successfully transmitted by a single conventional DCT transmitter path before the weaker carrier becomes too degraded for reliable transmission, or the necessary quality hardware components become prohibitively expensive.

FIG. 6 schematically illustrates an alternative known hardware arrangement for transmitting data via two adjacent signals requiring a relative signal strength imbalance. In FIG. 6, a dedicated transmitter path is provided for the generation of each of the two CA signals. A first transmitter path contains DACs 606 and 608; low-pass filters 610 and 612; mixers 614 and 616; local oscillator 618; quadrature generator 620; summing point 622, power amplifier 624; duplex filter 626; and antenna 628. A second transmitter path contains DACs 636 and 638; low-pass filters 640 and 642; mixers 644 and 646; local oscillator 648; quadrature generator 650; summing point 652, power amplifier 624; duplex filter 626; and antenna 628. The operation of DACs 606, 608, 636 and 638; low-pass filters 610, 612, 640 and 642; mixers 614, 616, 644 and 646; quadrature generators 620 and 650; summing points 622 and 652; power amplifier 624; duplex filter 626; and antenna 628; are the same as described previously in relation to FIG. 2. However, local oscillators 618 and 648 are configured to produce different frequencies by operating at the carrier frequency of the signal intended to be generated by their respective paths. In this manner, the two transmitter paths operate as two individual DCTs, one arranged to generate each carrier signal.

FIGS. 7a and 7b illustrate the operation of the alternative known hardware arrangement for transmitting data via two adjacent signals having a relative signal strength imbalance. The operation of the first transmitter path is shown on frequency amplitude graph 700a. Signal 702 is generated at baseband and mixed with local oscillator signal 706a operating at one of the required carrier frequencies ($f_{C_1}$). This results in the translation of signal 702 to $f_{C_1}$, as shown by translated signal 708 and arrow 712, as well as the generation of image signal 716, folded around the local oscillator frequency. As the local oscillator frequency is the same as the carrier frequency in this case, image signal 716 is generated on top of carrier signal 708, as shown by arrow 720.

The operation of the second transmitter path is shown on frequency amplitude graph 700b. Signal 704 is generated at baseband and mixed with local oscillator signal 706b operating at one of the required carrier frequencies ($f_{C2}$). This results in the translation of the signal to $f_{C2}$, as shown by translated signal 710 and arrow 714, as well as the generation of image signal 718, folded around the local oscillator frequency. Again, as the local oscillator frequency is the same as the carrier frequency, image signal 718 is generated on top of carrier signal 710, as shown by arrow 722.

Since the magnitude of image signals 716 and 718 are now proportional to signals which they overlap (708 and 710 respectively), the finite IRR of the transmitter can be expected to suppress these images effectively. The two generated signals can then be summed prior to transmission to form the required power imbalanced CA signals.

Due to the use of independently configurable local oscillators, this method is more commonly used for noncontiguous carrier aggregation, where the two signals may be transmitted at very different carrier frequencies and the single DCT operating as a low-IF transmitter for both carriers (as described previously) is not appropriate. However, when applied to a contiguous carrier aggregation configuration, the two local oscillators operate at very similar frequencies. In single integrated circuit deployments, the configuration may suffer from local oscillator pulling due to difficulties in sufficiently isolating the two local oscillators from one another. The effect of this is to cause instabilities in the generated signals as the two operating frequencies tend towards each other, thereby impeding the successful operation of the transmitter. Additionally, the complexity of the summing point and associated losses are increased. Further, this arrangement has increased silicon area and power consumption costs when compared to the single. DCT arrangement described with reference to FIG. 2, which make it a less desirable solution. Hence, it is an objective of the present disclosure to provide improved transmitter hardware, capable of effectively transmitting data via aggregated carrier signals.

SUMMARY

In accordance with exemplary embodiments described herein, there is provided a transmitter, and a method of configuring a transmitter, to transmit data via a combination of a first signal modulated at a first carrier frequency, and a second signal modulated at a second carrier frequency, different to the first carrier frequency.

One exemplary embodiment provides a transmitter comprising a local oscillator and is configured to identify a signal strength of the first signal and a signal strength of the second signal, and adaptively configure the local oscillator to operate at a first local oscillator frequency and an alternative local oscillator frequency, different to the first frequency, in dependence on the required signal strength of the first signal relative to the required signal strength of the second signal.

Another exemplary embodiment provides a method comprising identifying a first signal strength corresponding to the first signal, identifying a second signal strength corresponding to the second signal, and configuring a local oscillator to adaptively operate at a first local oscillator frequency and an alternative local oscillator frequency, different to the first local oscillator frequency, in dependence on the identified first signal strength relative to the identified second signal strength.

By varying the operating frequency of a local oscillator, the result of any frequency up-conversion that occurs in the transmitter can be tailored to suit differences in the required signal strengths of the transmitted signals. Hence, the transmitter hardware can be dynamically optimised to generate CA signals of differing signal strengths.

Further features and advantages will become apparent from the following description of preferred embodiments, given by way of example only, which is made with reference to the accompanying drawings.

BRIEF DESCRIPTION OF THE DRAWINGS

FIGS. 7a and 7b show frequency-amplitude graphs illustrating the operation of an alternative known hardware arrangement for transmitting data via two adjacent signals having a relative signal strength imbalance.

DETAILED DESCRIPTION

Embodiments described herein provide a transmitter capable of transmitting carrier aggregated data via two carrier signals requiring a relative signal strength imbalance by adaptively reconfiguring a local oscillator frequency in dependence on the nature of the required signal strength imbalance between the two signals.

Figure 3:
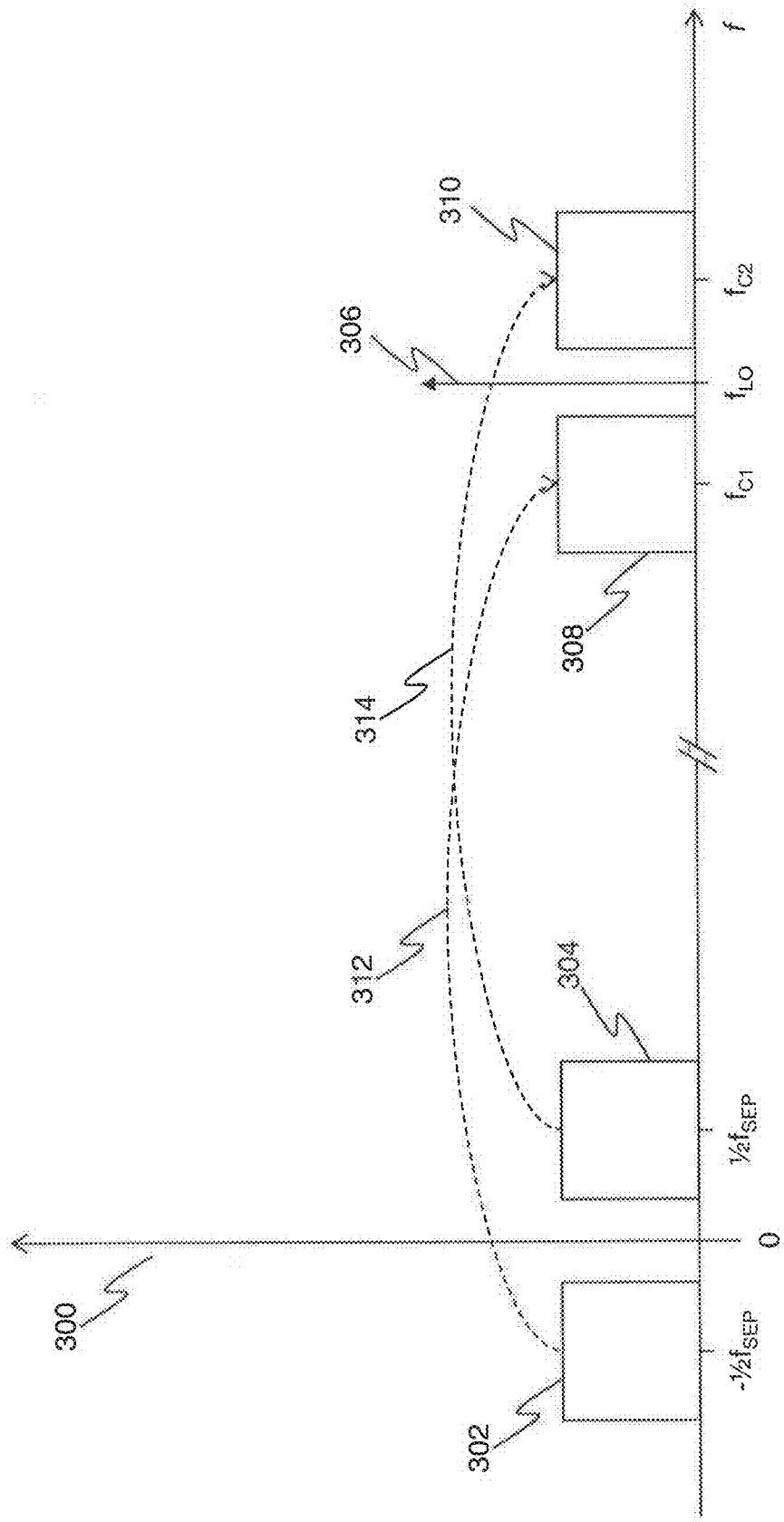
FIG. 3 shows a frequency-amplitude graph illustrating the operation of a conventional transmitter when used as a low-IF transmitter to transmit data via two adjacent signals.
Figure 4:
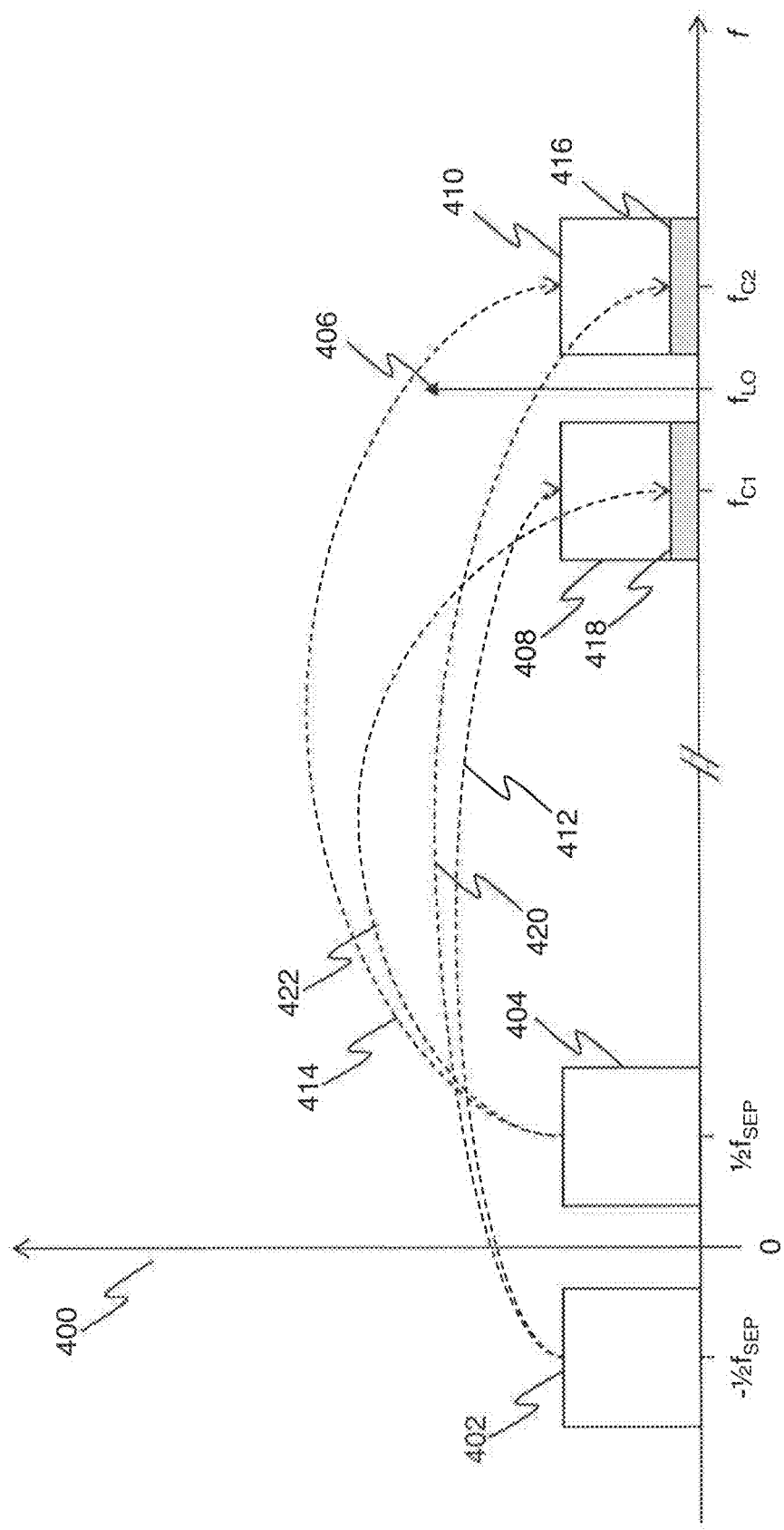
FIG. 4 shows a frequency-amplitude graph illustrating the operation of a conventional transmitter when used as a low-IF transmitter to transmit data via two adjacent signals, including image signals resulting from component imperfections.
Figure 5:
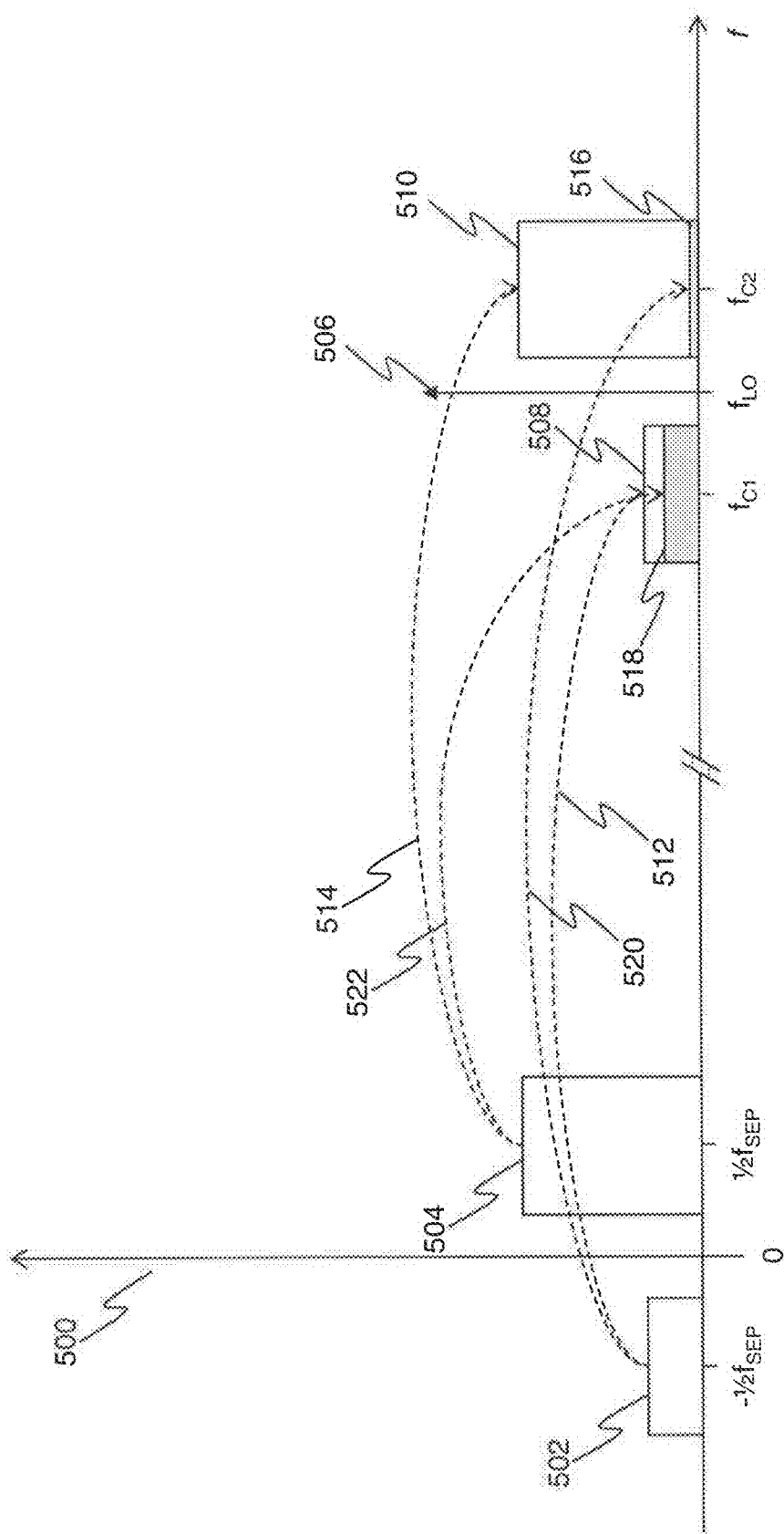
FIG. 5 shows a frequency-amplitude graph illustrating the operation of a conventional transmitter when used as a low-IF transmitter to transmit data via two adjacent signals having a relative signal strength imbalance.
Figure 6:
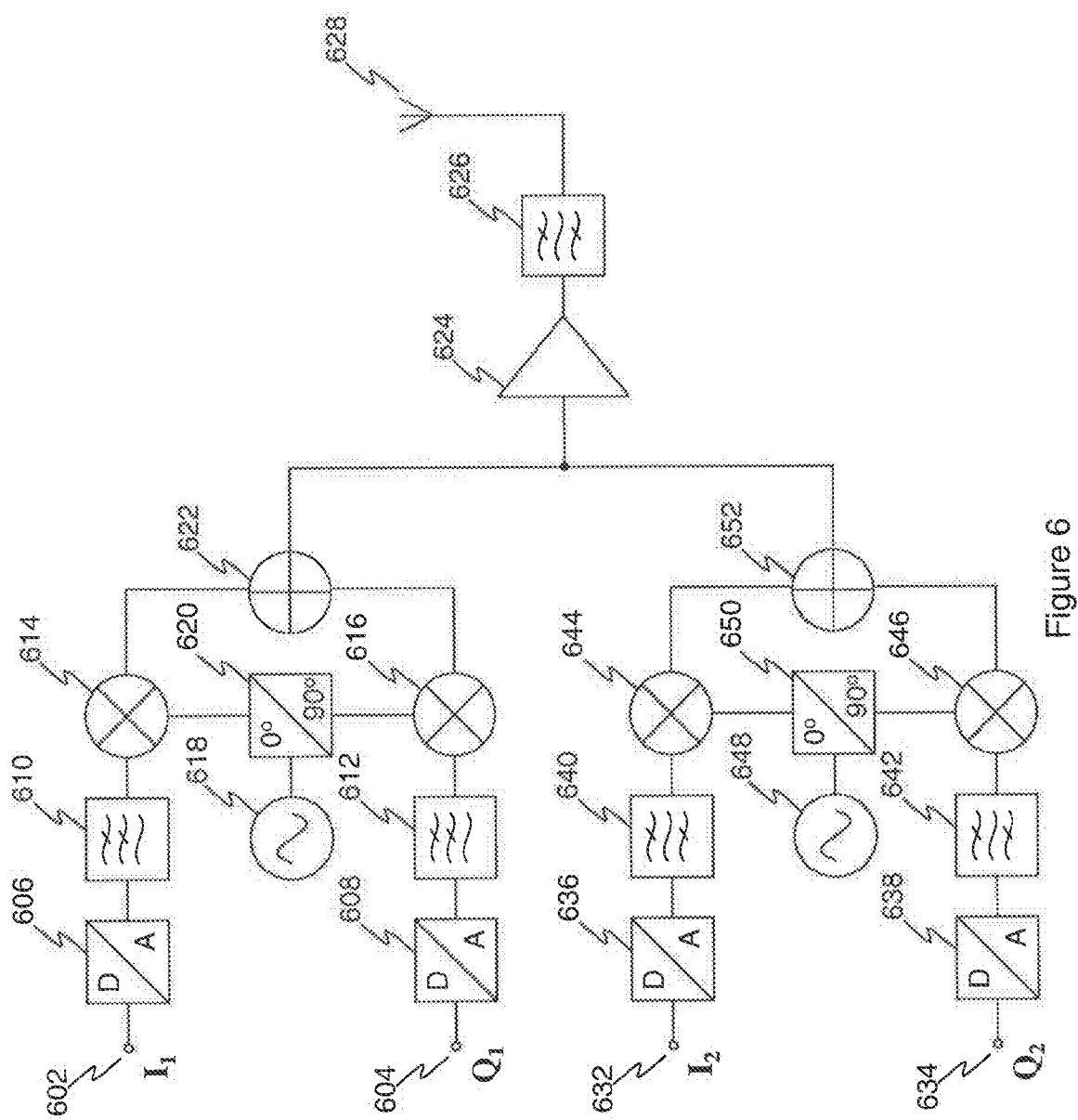
FIG. 6 schematically illustrates an alternative known hardware arrangement for transmitting data via two adjacent signals having a relative signal strength imbalance.

When the signal strengths of the transmitted signals are substantially similar, the local oscillator is configured to operate at a frequency that is substantially halfway between the carrier frequencies of the two carrier signals. Under this mode of operation, the transmitter is configured to behave as a low-IF transmitter for both signals, and transmit the two carrier signals as described previously with relation to FIG. 3. However, when the required signal strengths of the transmitted signals are dissimilar, the operating frequency of the local oscillator is altered, and the local oscillator is instead configured to operate at a frequency substantially the same as the carrier frequency of one of the transmitted signals.

Figure 8:
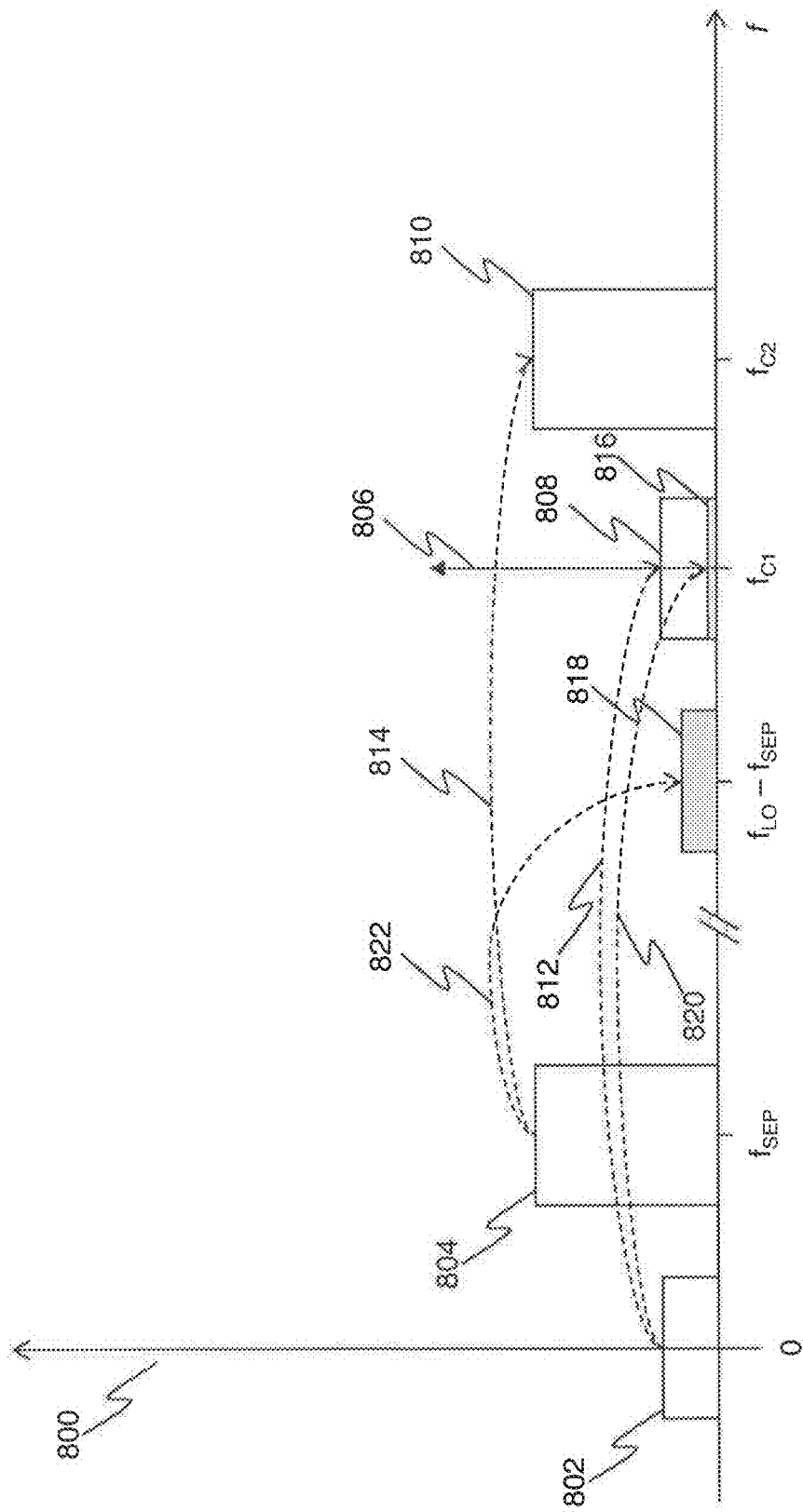
FIG. 8 shows a frequency-amplitude graph illustrating the operation of a transmitter according to embodiments of the disclosure.

FIG. 8 illustrates on frequency amplitude graph 800 the operation of a transmitter according to embodiments of the disclosure when used to transmit data via two adjacent signals having a relative signal strength imbalance. A first signal 802 is synthesised at baseband frequency, whilst a second signal 804 is synthesised at low frequency, centred at a frequency equal to the required channel separation distance of the CA signals. As described previously, mixing a signal having frequency f with local oscillator signal 806 results in frequency up-conversion to $f_{LO}+f$ and $f_{LO}-f$. However, careful construction of the signal in the digital domain allows controlled up-conversion to only one of these frequencies. Under the operating method described herein, the signals are up-converted to $f_{LO}+f$, and hence the local oscillator is configured to operate at carrier frequency of the lower carrier signal. Signal 802 is therefore translated to $f_{LO}+0$ (i.e. to $f_{C1}$) as shown by translated signal 808 and arrow 812. Signal 802 also creates image 816 (folded around the local oscillator frequency) overlapping translated signal 808, as shown by arrow 820. Signal 804 is translated to $f_{LO}+f_{SEP}$ (i.e. to $f_{C2}$), as shown by translated signal 810 and arrow 814. Signal 804 also creates image 818, folded around the local oscillator frequency to frequency $f_{LO}-f_{SEP}$, i.e. not overlapping either of the transmitted CA signals, as shown by arrow 822.

Hence, by using this method, the signal synthesised at baseband frequency is only subject to its own image after frequency up-conversion, and the signal synthesised at low-IF is not subject to either image. This guarantees that neither signal is subjected to an image with a proportional magnitude that the finite IRR of a conventional transmitter path would be incapable of effectively suppressing.

Signal 802 is translated directly from baseband to be centred on the local oscillator frequency, and hence is suitable for processing using a conventional DCT arrangement. Advantageously, this means that the same hardware used to transmit both signals when the signal strengths of the CA signals are similar, can be used in this configuration to generate signal 808 with minimal adaption. The other signal does not have these properties however, and therefore cannot be generated using the conventional DCT architecture under this method. Hence, an additional transmitter path is required. Alternatively, a conventional low-pass transmitter architecture with a wide bandwidth and high signal separation capabilities could generate both signals in the digital domain, but this would require the DAC resolution to be sufficient to all of the channels at different power levels simultaneously, which would require more expensive DAC components and is a less optimised use of the provisioned hardware.

Figure 1:
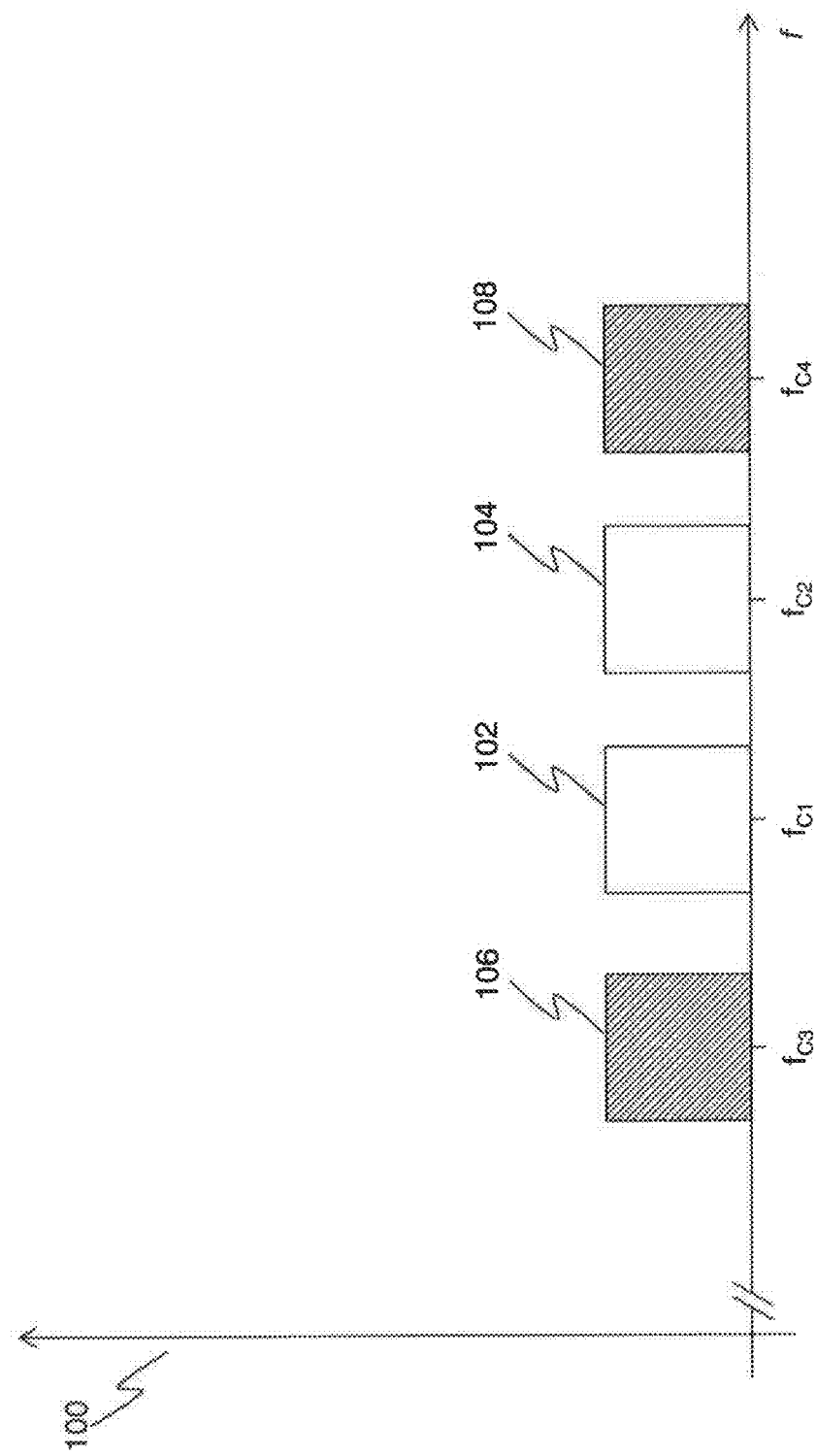
FIG. 1 shows a frequency-amplitude graph illustrating two variations of carrier aggregation.
Figure 2:
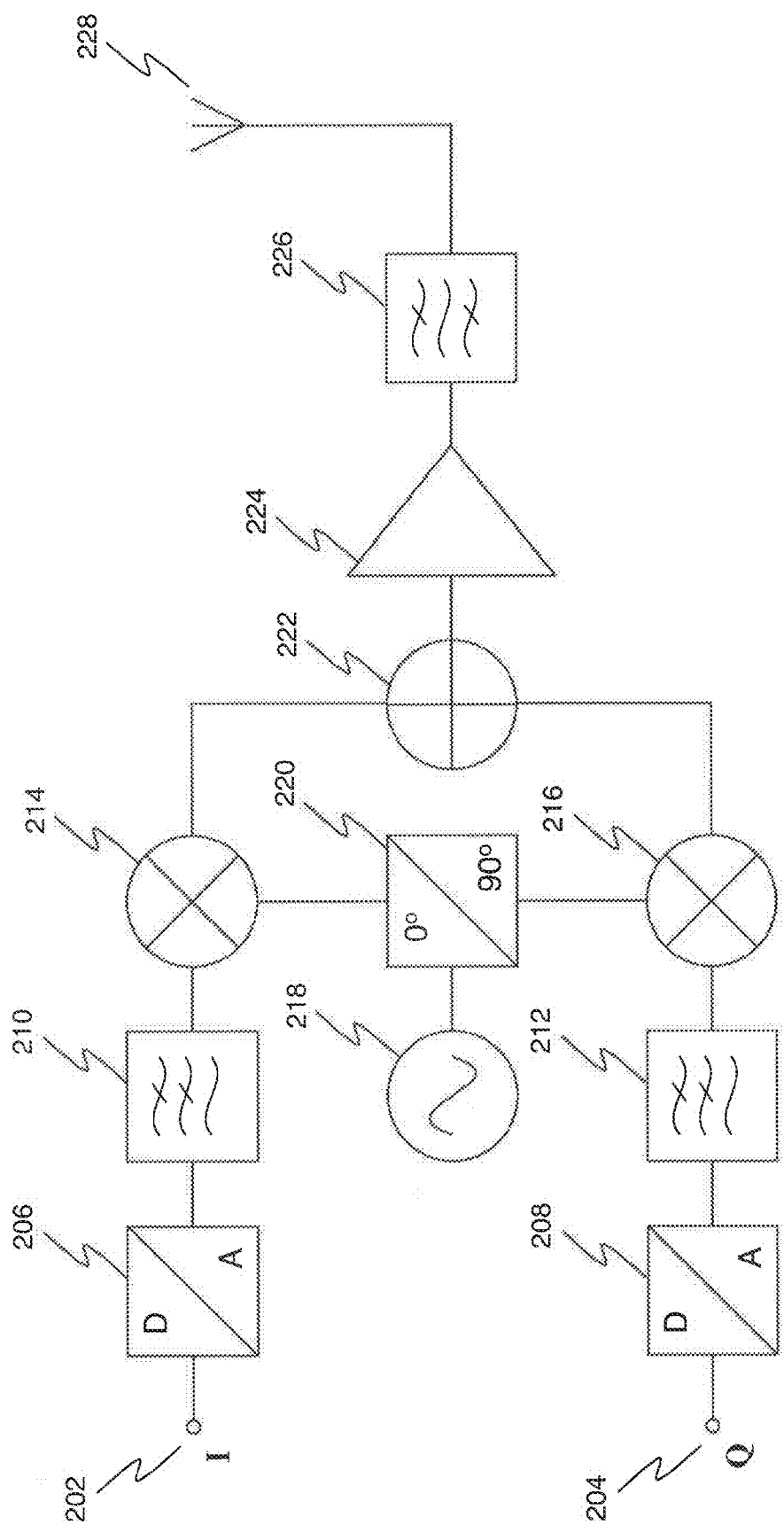
FIG. 2 schematically illustrates an exemplary DCT as known in the art.
Figure 9:
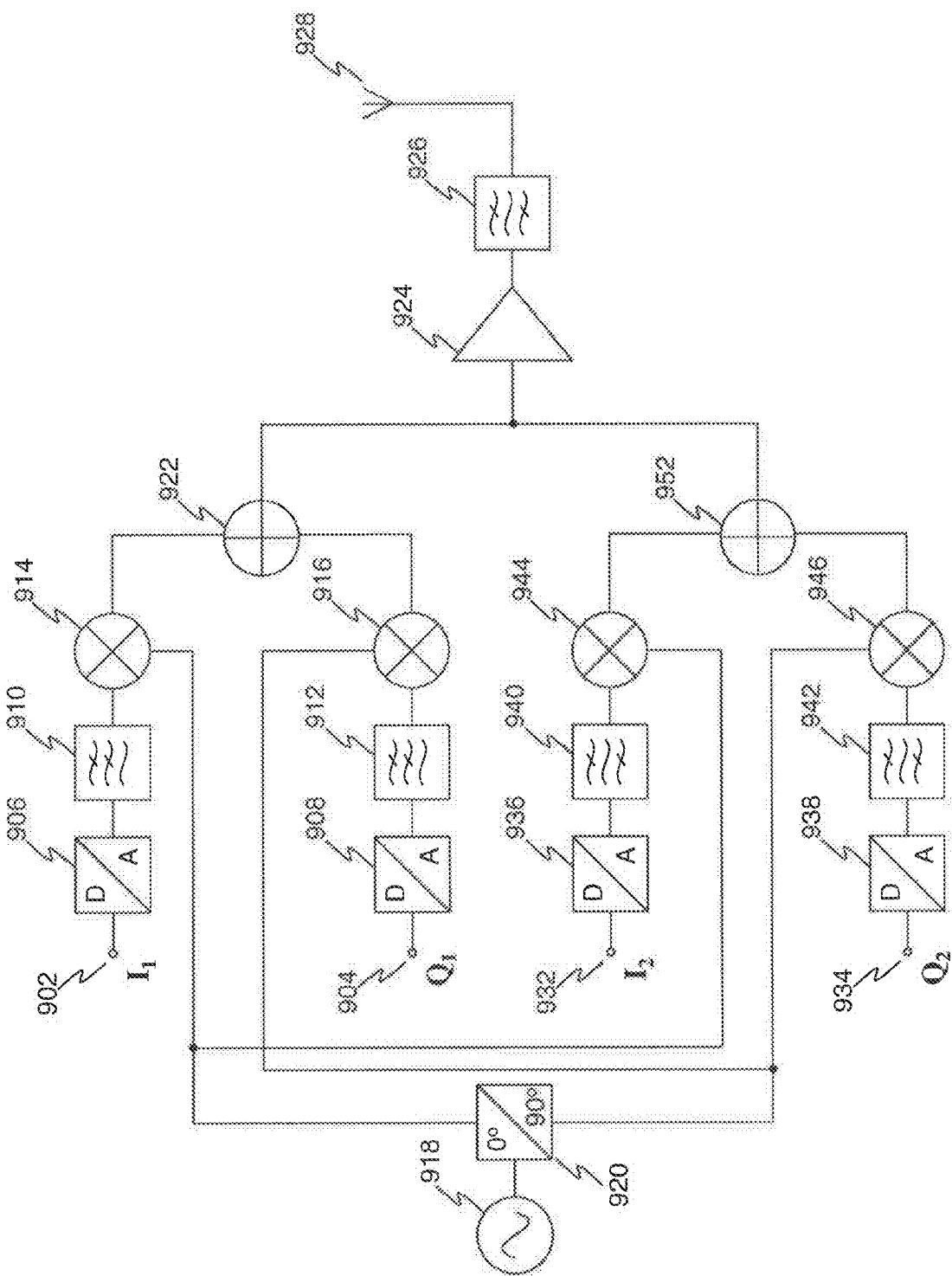
FIG. 9 schematically illustrates an exemplary transmitter according to embodiments of the disclosure.

FIG. 9 schematically illustrates an exemplary transmitter according to embodiments of the disclosure. According to these embodiments, a single local oscillator 918 is shared between two available transmitter paths. A first transmitter path contains DACs 906 and 908; low-pass filters 910 and 912; mixers 914 and 916; local oscillator 918; quadrature generator 920; summing point 922, power amplifier 924; duplex filter 926; and antenna 928. A second transmitter path contains DACs 936 and 938; band-pass filters 940 and 942; mixers 944 and 946; local oscillator 918; quadrature generator 920; summing point 952, power amplifier 924; duplex filter 926; and antenna 928. The operation of DACs 906, 908, 936 and 938; low-pass filters 910 and 912; mixers 914, 916, 944 and 946; quadrature generator 920; summing points 922 and 952; power amplifier 924; duplex filter 926; and antenna 928; are the same as described previously in relation to FIG. 2. However, local oscillator 918 is configured to operate at a frequency that is dependent on the relative signal strengths required of the transmitted signals as described above with reference to FIG. 8. As mentioned above, the signal generated by local oscillator 918 is utilised by both transmitter paths.

The first transmitter path is configured to operate as a DCT, and is capable of transmitting two contiguous CA signals when the required signal strengths of the transmitted signals are substantially similar, or transmitting a single signal when the signal strengths of the signals are dissimilar, as described above in relation to FIG. 8. In order to effectively operate in both arrangements, the filter profiles of low pass filters 910 and 912 may be adjusted in order to reflect the lower corner frequency required when transmitting a smaller aggregate bandwidth. The first transmitter path may operate as a general purpose transmitter path, capable of transmitting signals transmitted according to several communication schemes, in which case the hardware of the first transmitter path may be further adaptable in order to ensure effective operation with these schemes.

When the signal strengths of the two signals are dissimilar, the transmitter utilises the second transmitter path in order to generate the low IF signal. The second transmitter path includes band-pass filters 940 and 942 which are used to isolate the low IF signal from any adjacent unwanted frequency components before frequency up-conversion. Otherwise, the operation of the second transmitter path components is equivalent to those of the first transmitter path.

By sharing local oscillator 918 between both transmitter paths, the problem of local oscillator pulling, which arises when synthesising two similar frequencies in close physical proximity, is advantageously avoided. Further, by using the same input signal and local oscillator frequency for both transmitter paths, emission end hardware such as duplex filter 926 and power amplifier 924 can be effectively shared between both transmitter paths due to the equivalent emission end requirements of both paths.

In the embodiment shown in FIG. 9, the signals generated by the first transmitter path and the second transmitter path are combined just prior to being input to power amplifier 924. However, in an alternative arrangement (not shown), the signals may be combined within the power amplifier 924: for example in arrangements in which the power amplifier 924 comprises an input stage and a cascode stage, the signals could be combined before the cascode stage, while for a power amplifier 924 that comprises more than two stages, the combination could be configured between two of the later stages.

The two transmitter paths may each include a variable amplification stage (not shown) in order to allow the two signals to be generated using the full dynamic range of the DAC hardware, with the necessary amplitude adjustments being made at a subsequent stage in the path. This advantageously allows the resolution of the conversion into the analogue domain to be maximised. The relative gains of these variable amplification stages may be configured to be proportional to the required signal strengths of the two CA signals in order to achieve required difference in signal strengths when transmitted. Such amplification may be provided by amplifier circuitry such as operational-amplifiers or the like.

A further advantage of the transmitter depicted in FIG. 9 is that the second transmitter path is used only in carrier aggregation scenarios, and hence does not need to meet the same set of requirements as the more general purpose first transmitter path. As a result, the specification of the hardware components of the second transmitter path is, in most cases, less strict than that of the first path, making the addition of the second transmitter path less expensive than might be expected.

The similarity of the signal strengths of the transmitted signals may be assessed in the digital domain on the basis of a required signal strength parameter obtained from a receiving party associated with each transmitted signal. Identifying and implementing a required signal strength is a common step in known transmitter architectures, and the identified value is conventionally used to calibrate amplification stages. The identified required signal strength values may be subject to a comparison operation (e.g. subtraction) in order to calculate the magnitude and sign of the difference between the signal strengths.

In order to determine whether the signal strengths are sufficiently dissimilar to require the use the second transmitter path, the magnitude of the difference identified may be compared to a predetermined threshold level by performing a suitable comparison operation. This comparison operation could entail a further calculation in the digital domain in order to determine whether the magnitude has exceeded the threshold level. The threshold level may be configured so as to trigger the use of the second transmitter path when the magnitude of the signal strength imbalance would result in unreliable operation of the transmitter if the single transmitter path was used for both signals.

According to some embodiments, the threshold level may be adapted in order to vary the strictness of the determination of similarity. For example the threshold level may be lowered in order to reduce the difference in signal strengths required before the second transmitter path is used. This advantageously allows the threshold level to be determined relative to a required signal strength of one of the CA signals. For example the threshold level may be configured to represent a certain percentage of the required signal strength of the strongest signal, thereby triggering the use of the second transmitter path at smaller absolute signal strength difference when both of the signals are require a relatively low signal strength, as compared to when both of the signals require a relatively high signal strength. Further, the threshold level may be configured to introduce hysteresis into the comparison in order to prevent rapid switching between outputs when the difference in signal strengths is fluctuating around the threshold level.

The output of this comparison can be used directly by the transmitter to determine whether the local oscillator should operate at the first frequency (halfway between the first and second carrier frequencies) or at the second frequency (the carrier frequency of one of the transmitted CA signals).

As described previously, careful manipulation of the signals synthesised in the digital domain allows the mixing operation with the local oscillator signal to be configured to result in a translation to $f_{LO}+f$. As an alternative, the mixing operation with the local oscillator can be configured to result in a translation to $f_{LO}-f$; using the $f_{LO}-f$ configuration enables an alternative operating method for producing the required power unbalanced CA signals.

Figure 10:
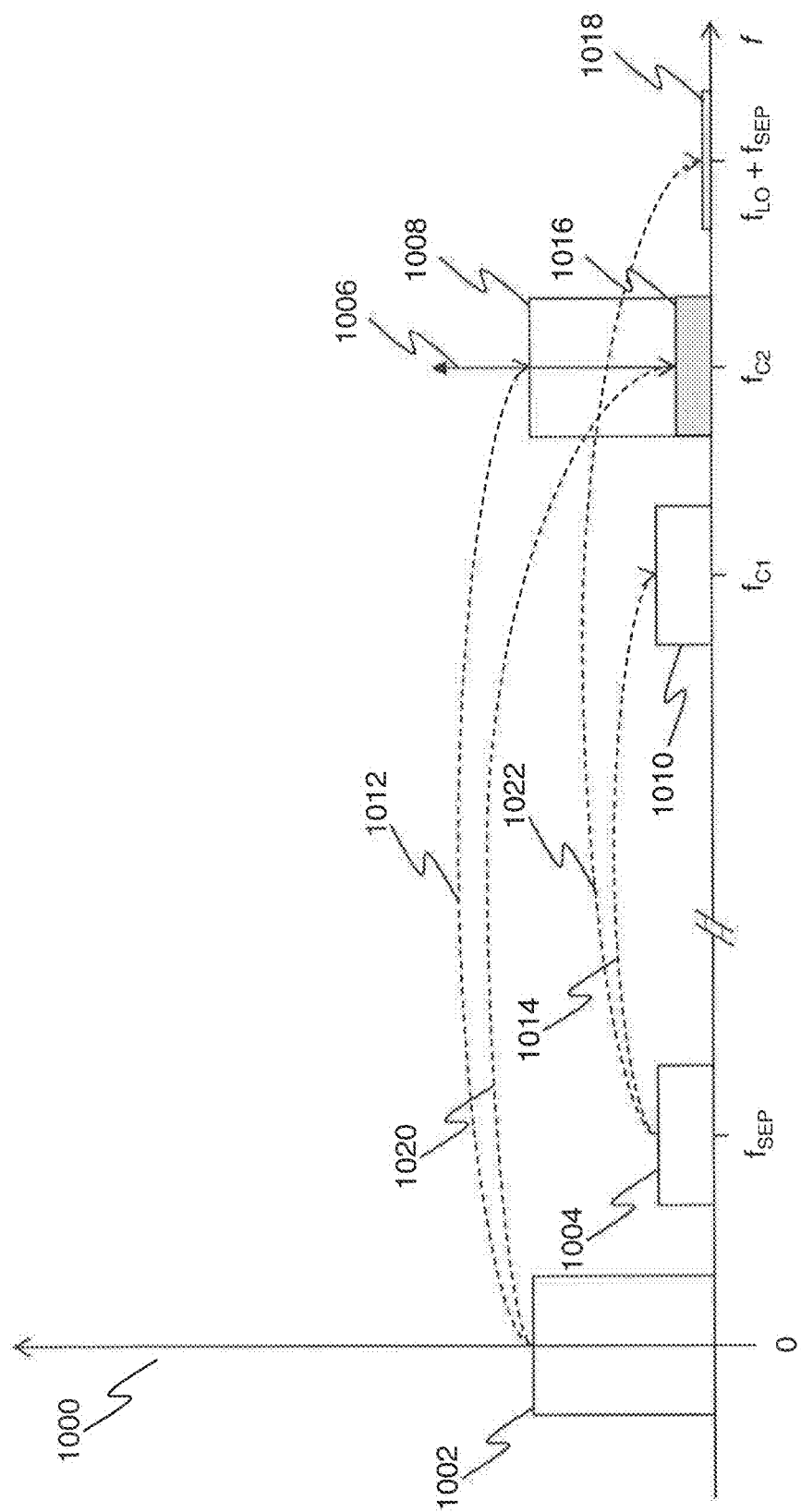
FIG. 10 shows a frequency-amplitude graph illustrating the operation of a transmitter according to embodiments of the disclosure.

FIG. 10 illustrates on frequency amplitude graph 1000 the operation of a transmitter according to embodiments of the disclosure when used to transmit data via two adjacent signals having a relative signal strength imbalance. A first signal 1002 is synthesised at baseband frequency, whilst a second signal 1004 is synthesised at low frequency, centred at a frequency equal to the required channel separation distance of the CA signals. Under this method, mixing these signals with local oscillator signal 1006 results in frequency up-conversion to $f_{LO}-f$, hence the local oscillator is configured to operate at the higher carrier frequency. Signal 1002 is translated to $f_{LO}-0$ (i.e. to $f_{C2}$) as shown by translated signal 1008 and arrow 1012. Signal 1002 also creates image 1016 (folded around the local oscillator frequency) overlapping translated signal 1008, as shown by arrow 1020. Signal 1004 is translated to $f_{LO}-f_{SEP}$, (i.e. to $f_{C1}$), as shown by translated signal 1010 and arrow 1014. Signal 1004 also creates image 1018, folded around the local oscillator frequency to frequency $f_{LO}-f_{SEP}$, i.e. not overlapping either of the transmitted CA signals, as shown by arrow 1022.

Again, by using this method, the signal synthesised at baseband frequency is only subject to its own image after frequency up-conversion, and the signal synthesised at low-IF is not subject to either image. This guarantees that neither signal is subjected to an image with a proportional magnitude that the finite IRR of a DCT is incapable of effectively suppressing.

The choice of which of the above operating methods to use is subject to several considerations. Firstly, by selecting the operating method to ensure that the second transmitter path is responsible for generating the higher powered signal, the selection of hardware components in the second transmitter path can be optimised for the generation of higher powered signals. Alternatively, by selecting the operating method to ensure that the second transmitter path is responsible for generating the lower powered signal, the selection of hardware components in the second transmitter path can be optimised for the generation of lower powered signals.

Further, after mixing with the local oscillator signal, the signal that was generated in low-IF generates an image that is folded outside of the frequency channel allocated to the contiguous CA signal, as shown previously. In many communication schemes, this will overlap a neighbouring frequency channel that may be currently allocated to another device. Clearly, this may impact the reliability of the communications taking place on that out of band channel. To combat such scenarios, there is typically a limit imposed on what level of out-of-band-emissions are acceptable, commonly defined using a spectral emission mask.

Figure 11:
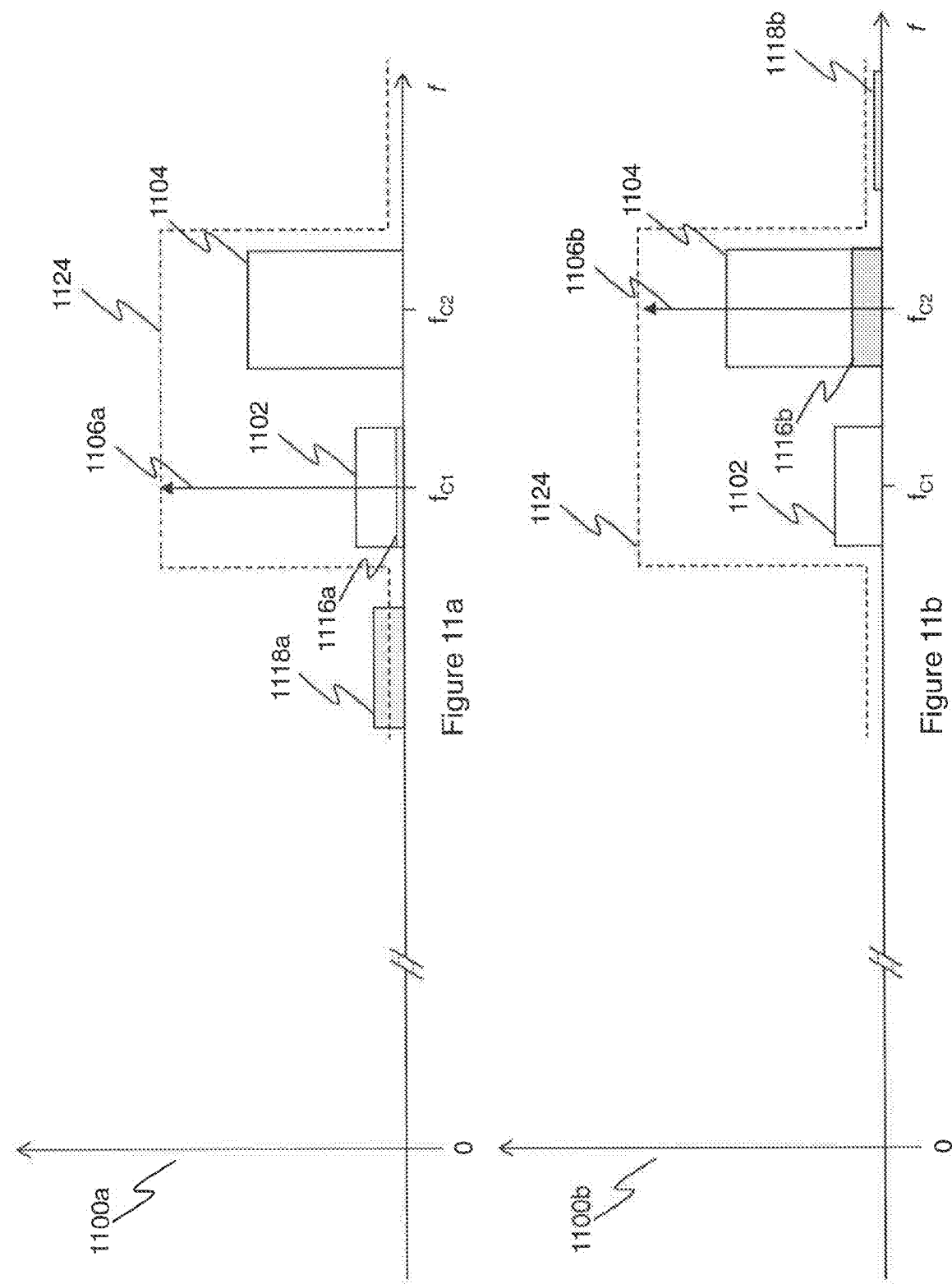
FIGS. 11a and 11b show frequency-amplitude graphs illustrating the effect of choice of operating method on compliance with a spectral emission mask according to embodiments of the disclosure.

FIGS. 11a and 11b illustrate on frequency amplitude graphs 1100a and 1100b how the choice of operating method effects compliance with a typical spectral emission mask 1124. FIG. 11a shows the signals 1102 and 1104 and images 1116a and 1118a generated using local oscillator signal 1106a operating at the carrier frequency of the lower powered carrier, as in the operating method described previously in relation to FIG. 8, FIG. 11b shows the signals 1102 and 1104 and images 1116b and 1118b generated using local oscillator signal 1106b operating at the carrier frequency of the higher powered carrier, as in the operating method described previously in relation to FIG. 10.

In FIG. 11a, the image 1118a of the higher powered carrier 1104 is folded outside of the allocated frequency channel, and in this case, violates the limit described by the spectral emission mask. While it may be possible to apply a band pass filter to the signal before transmission to attenuate the out of band image signal, in practice, the filter sensitivity and roll-off required to do so without impacting the transmitted signals make implementing such a filter impractical and expensive. However, in FIG. 11b, the image 1118b of the lower powered carrier 1102 is folded outside of the allocated frequency channel, and as such is less likely to violate the limit described by the spectral emission mask. Hence, by selecting the operating method to ensure that the second transmitter path is responsible for generating the lower powered signal, the magnitude of the image generated outside of the allocated frequency channel can be minimised.

Additionally, in many communications schemes, a nearby frequency channel will often be used for a corresponding downlink channel by a receiver that shares the same antenna as the transmitter. As a result of sharing a single antenna, the transmitted signals and the local oscillator signal both generate noise which can affect the downlink channel. Hence, selection of the operating method can be made to minimise the effect of this noise on the receiver channel. By selecting the operating method to ensure that the second transmitter path is responsible for generating the signal that is closest in frequency to the downlink channel, the local oscillator is ensured to operate at the carrier frequency which is furthest away from the receiver channel, thereby reducing the phase noise from the local oscillator. Further, this additionally ensures that the out-of-band image signal is folded away from the receiver channel, thereby also minimising the effect of the transmission noise on the receiver channel.

Until now, the operation of embodiments have been illustrated with respect to a contiguous CA signal where the lower frequency carrier signal is the less powerful signal. It will be appreciated that the same hardware can be used in situations where the lower frequency carrier is the more powerful signal.

Figure 12:
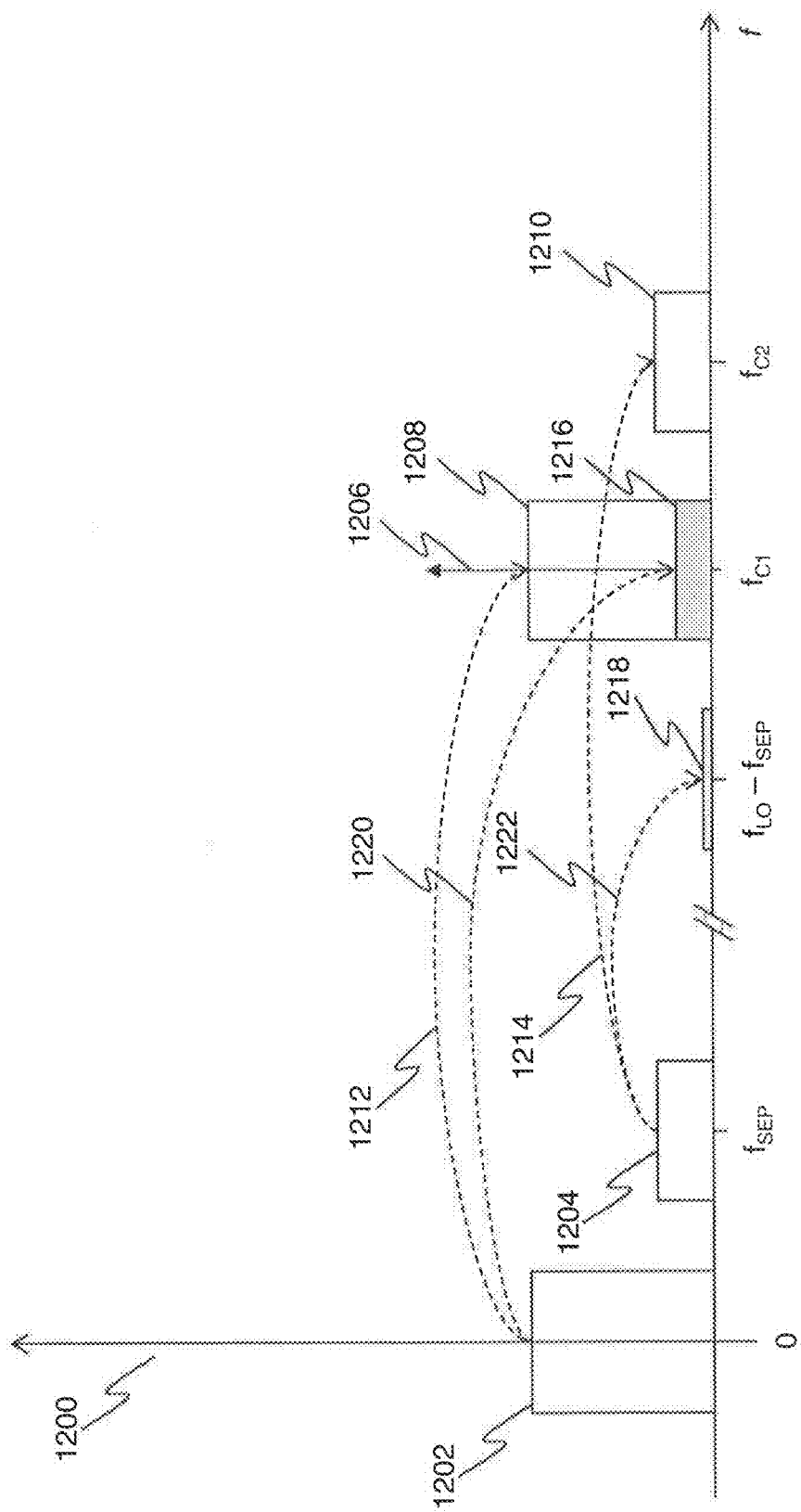
FIG. 12 shows a frequency-amplitude graph illustrating the operation of a transmitter according to further embodiments of the disclosure.

FIG. 12 illustrates on frequency amplitude graph 1200 the operation of a transmitter according to embodiments of the disclosure when used to transmit data via two adjacent signals having a relative signal strength imbalance. A first signal 1202 is synthesised at baseband frequency, while a second signal 1204 is synthesised at low frequency, centred at a frequency equal to the required Channel separation distance of the CA signals. Under this operating method, mixing a signal having frequency f with local oscillator signal 1206 results in frequency up-conversion to $f_{LO}$ f, hence the local oscillator is configured to operate at the lower carrier frequency. Signal 1202 is translated to $f_{LO}+0$ (i.e. to $f_{C1}$) as shown by translated signal 1208 and arrow 1212. Signal 1202 also creates image 1216 (folded around the local oscillator frequency) overlapping translated signal 1208, as shown by arrow 1220. Signal 1204 is translated to $f_{LO}+f_{SEP}$, (i.e. to $f_{C2}$), as shown by translated signal 1210 and arrow 1214. Signal 1204 also creates image 1218, folded around the local oscillator frequency to frequency $f_{LO}-f_{SEP}$, i.e. not overlapping either of the transmitted CA signals, as shown by arrow 1222.

In this embodiment a contiguous CA signal has been generated where the lower frequency carrier signal is the more powerful signal by using a method equivalent to that described in relation to FIG. 8, but where the higher signal strength signal is synthesised at baseband frequency and the lower signal strength signal is synthesised at low-IF.

Figure 13:
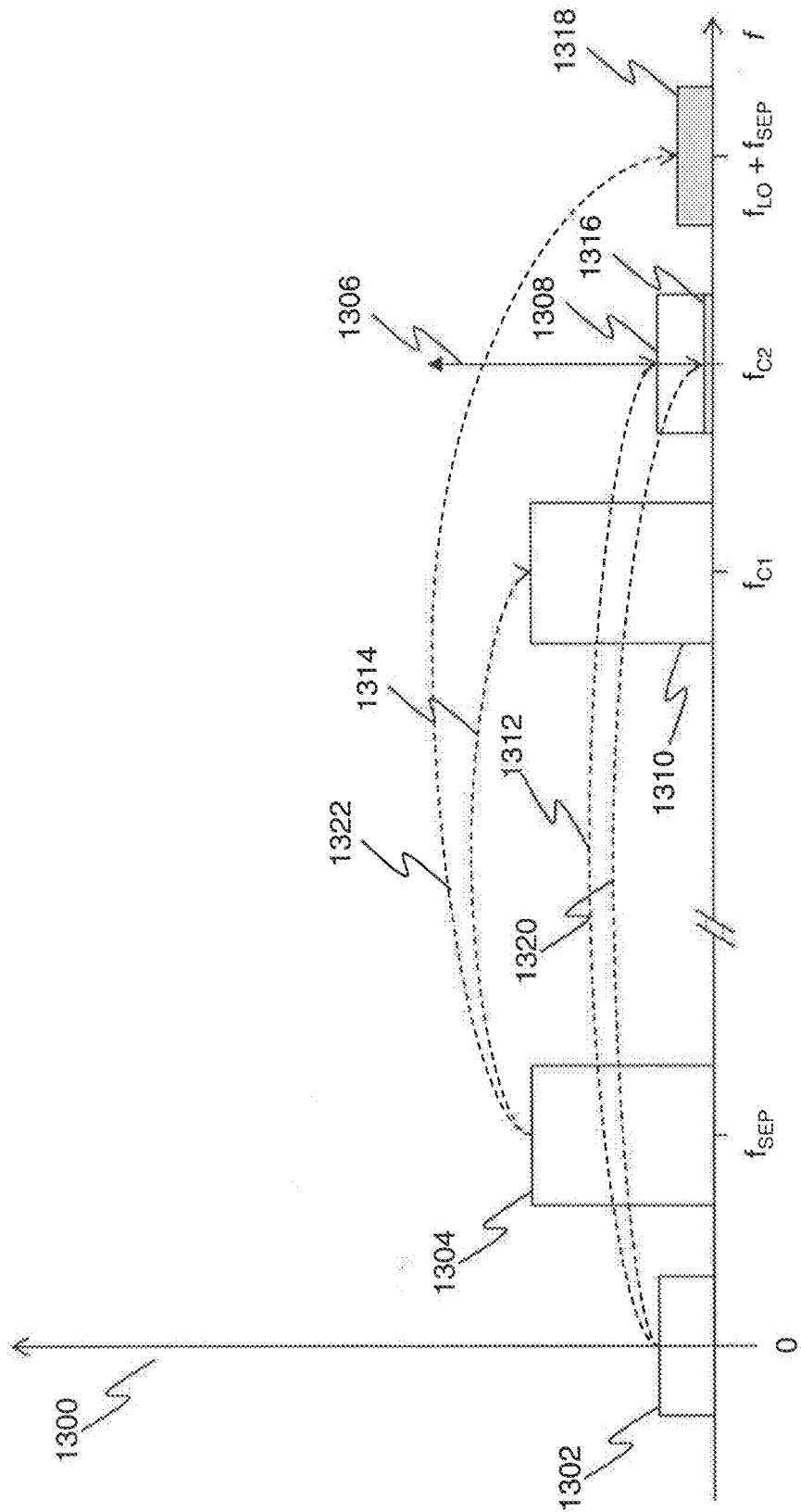
FIG. 13 shows a frequency-amplitude graph illustrating the operation of a transmitter according to yet further embodiments of the disclosure.

FIG. 13 illustrates on frequency amplitude graph 1300 operation of a transmitter according to embodiments of the disclosure when used to transmit data via two adjacent signals 1302, 1304, which, as for FIG. 12, have a relative signal strength imbalance. In this case, first signal 1302 is smaller in magnitude than second signal 1304. The first signal 1302 is synthesised at baseband frequency, whilst the second signal 1304 is synthesised at low frequency, centred at a frequency equal to the required channel separation distance of the CA signals. Under this operating method, mixing these signals with local oscillator signal 1106 results in frequency up-conversion to $f_{LO}-f$, hence the local oscillator is configured to operate at the higher carrier frequency. Signal 1302 is translated to $f_{LO}-0$ (i.e. to $f_{C2}$) as shown by translated signal 1308 and arrow 1312. Signal 1302 also creates image 1316 (folded around the local oscillator frequency) overlapping translated signal 1308, as shown by arrow 1320. Signal 1304 is translated to $f_{LO}-f_{SEP}$, (i.e. to $f_{C1}$), as shown by translated signal 1310 and arrow 1314. Signal 1304 also creates image 1318, folded around the local oscillator frequency to frequency $f_{LO}+f_{SEP}$, i.e. not overlapping either of the transmitted CA signals, as shown by arrow 1322.

Again, a contiguous CA signal has been generated where the lower frequency carrier signal is the more powerful signal by using a method equivalent to that described in relation to FIG. 10, but where the lower signal strength signal is synthesised at baseband frequency and the higher signal strength signal is synthesised at low-IF.

In embodiments of the disclosure, the second transmitter path is preferably utilised when the signal strengths of the two transmitter CA signals are determined to be different. In this arrangement, the second transmitter path may be configured into an inoperative state when not required, and in this manner, power consumption savings may be made.

Figure 14:
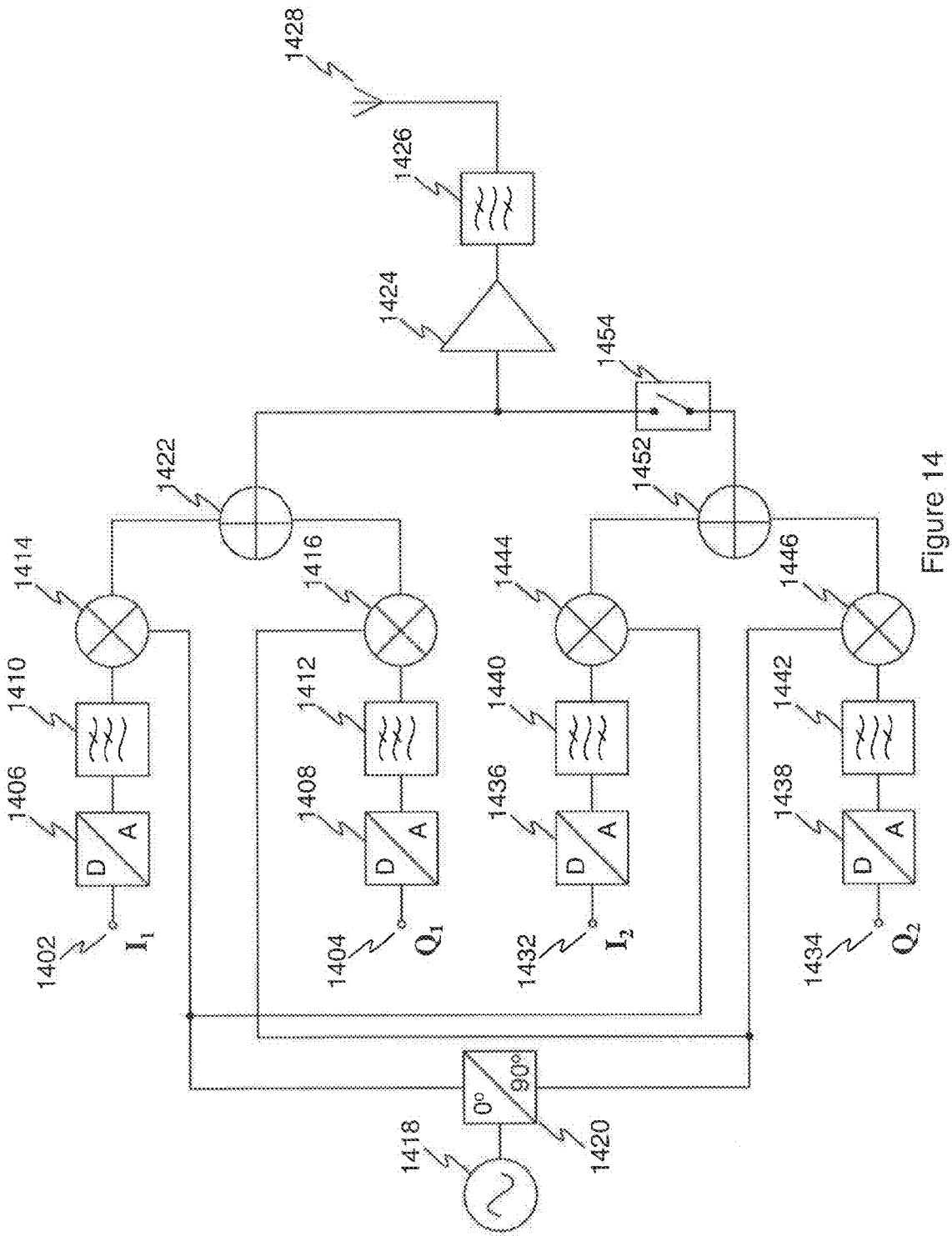
FIG. 14 schematically illustrates an alternative exemplary transmitter according to embodiments of the disclosure.

FIG. 14 schematically illustrates a transmitter according to a further embodiment; in this arrangement the transmitter includes means for configuring the second transmitter path into an inoperative state. The operation of DACs 1406, 1408, 1436 and 1438; low-pass filters 1410 and 1412; band-pass filters 1440 and 1442; mixers 1414, 1416, 1444 and 1446; local oscillator 1418; quadrature generator 1420; summing points 1422 and 1452; power amplifier 1424; duplex filter 1426; and antenna 1428; are the same as described previously in relation to FIG. 9. However, switch 1454 has been introduced on the second transmitter path just before the fork between the first and second transmitter paths, and power amplifier 1424. Switch 1454 may, for example, be a transistor switch, configurable to selectively block the transmitted output from the second transmitter from reaching power amplifier 1424, thereby rendering the second transmitter path inoperable. By blocking the signal in this way, the additional transient and switching power consumption associated with the operation of the subsequent transmitter components is reduced, thereby improving the power efficiency of the transmitter.

In alternative embodiments, the transmitter comprises additional power control hardware (not shown) configured to isolate the components of the second transmitter path from the transmitter's power supply in order to comprehensively minimise the additional power consumption attributable to the second transmitter path.

The state of switch 1454 and the aforementioned transmitter power control hardware may be controlled by the output of the required signal strength comparison calculations described previously such that the second transmitter path hardware is configured into the inoperative state automatically when the required signal strengths of the two CA signals are determined to be substantially different.

Figure 15:
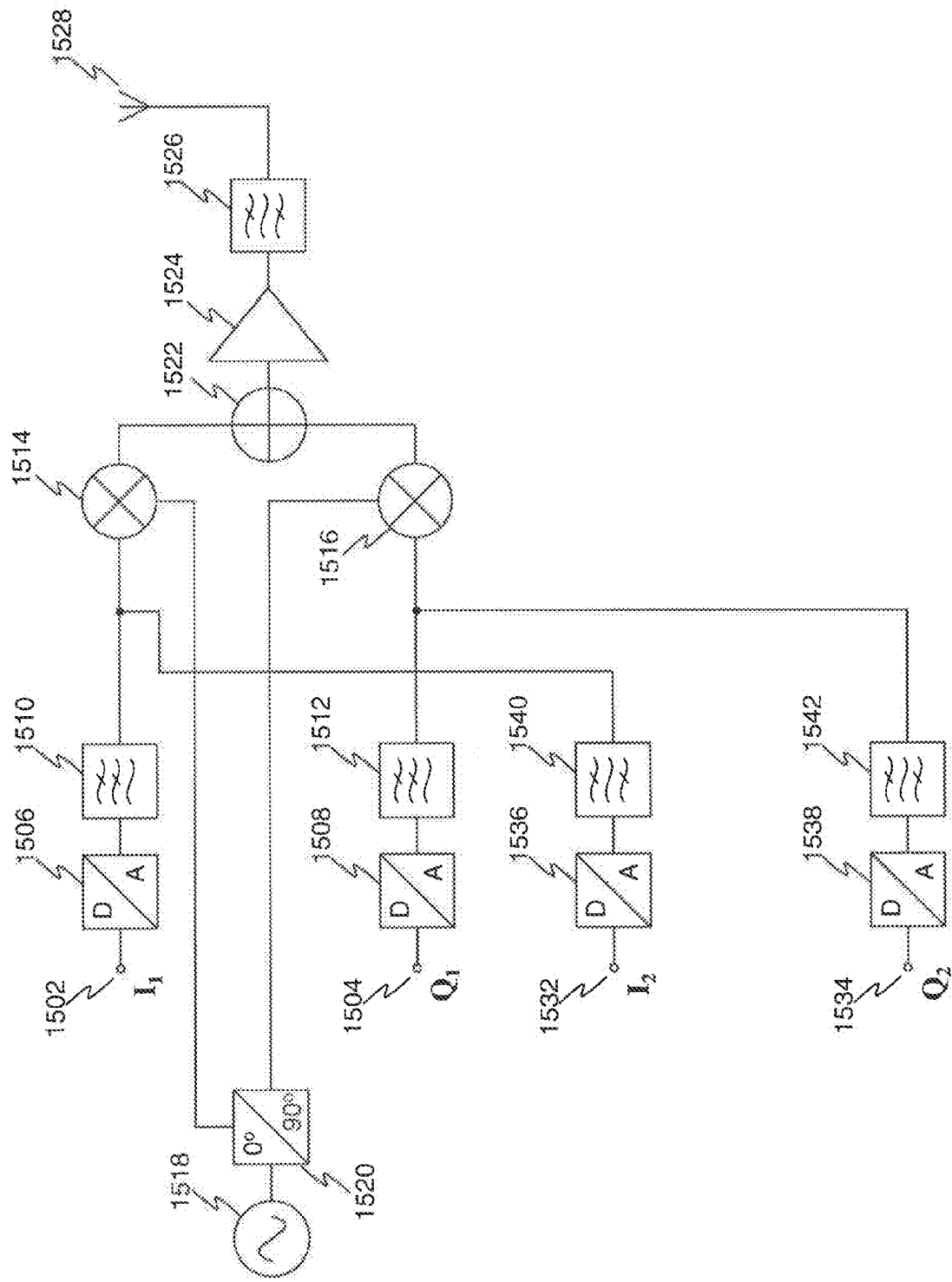
FIG. 15 schematically illustrates an exemplary transmitter according to embodiments of the disclosure wherein mixer hardware is shared between the two transmitter paths.

When sharing the local oscillator signal between both transmitter paths, further hardware can be shared between the two paths to make cost and silicon area savings. FIG. 15 schematically illustrates a transmitter according to an embodiment wherein mixer hardware is shared between the two transmitter paths. The operation of DACs 1506, 1508, 1536 and 1538; low-pass filters 1510 and 1512; band-pass filters 1540 and 1542; local oscillator 1518; quadrature generator 1520; summing point 1522; power amplifier 1524; duplex filter 1526; and antenna 1528; are the same as described previously in relation to FIG. 9. However, the fork between the first and second transmitter paths is now positioned before the input to mixers 1514 and 1516. Hence, mixer 1514 now mixes the combined I components of both signals with the in phase local oscillator signal, and mixer 1516 now mixes the combined Q components of both signals with the quadrature shifted local oscillator signal. As a result of sharing additional hardware components between the two transmitter paths, additional power consumption and silicon area cost savings can be made.

Figure 16:
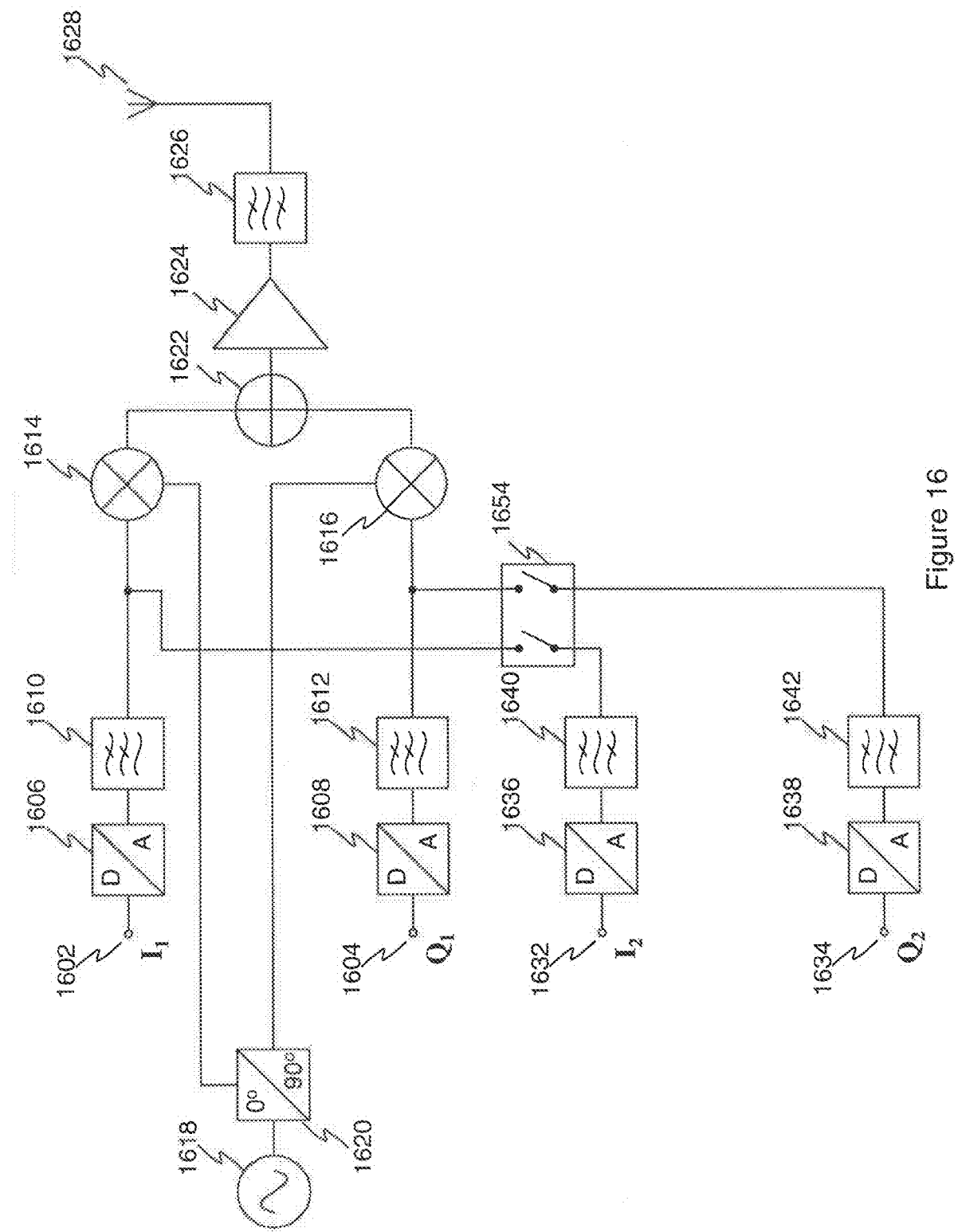
FIG. 16 schematically illustrates an exemplary transmitter according to embodiments of the disclosure wherein mixer hardware is shared between the two transmitter paths and the second transmitter path may be configured into an inoperative state.

FIG. 16 schematically illustrates a further transmitter according to an embodiment, wherein mixer hardware is shared between the two transmitter paths and the second transmitter path may be configured into an inoperative state. The operation of DACs 1606, 1608, 1636 and 1638; low-pass filters 1610 and 1612; band-pass filters 1640 and 1642; mixers 1614 and 1616; local oscillator 1618; quadrature generator 1620; summing point 1622; power amplifier 1624; duplex filter 1626; and antenna 1628; are the same as described previously in relation to FIG. 15.

In this arrangement, switching hardware 1654 has been introduced on the second transmitter path just before the fork between the first and second transmitter paths, resulting in the fork between the first and second transmitter paths comprising two channels. As a result, the switching hardware required to selectively block the signal from reaching the subsequent components of the second transmitter path is of slightly greater complexity than the equivalent switching hardware described previously in relation to FIG. 14. However, when the transmitter alternatively includes the aforementioned isolating power control hardware described above, the complexity of the power control hardware is not increased, and indeed may even be reduced as a result of the fewer subsequent hardware components in the second transmitter path.

Figure 17:
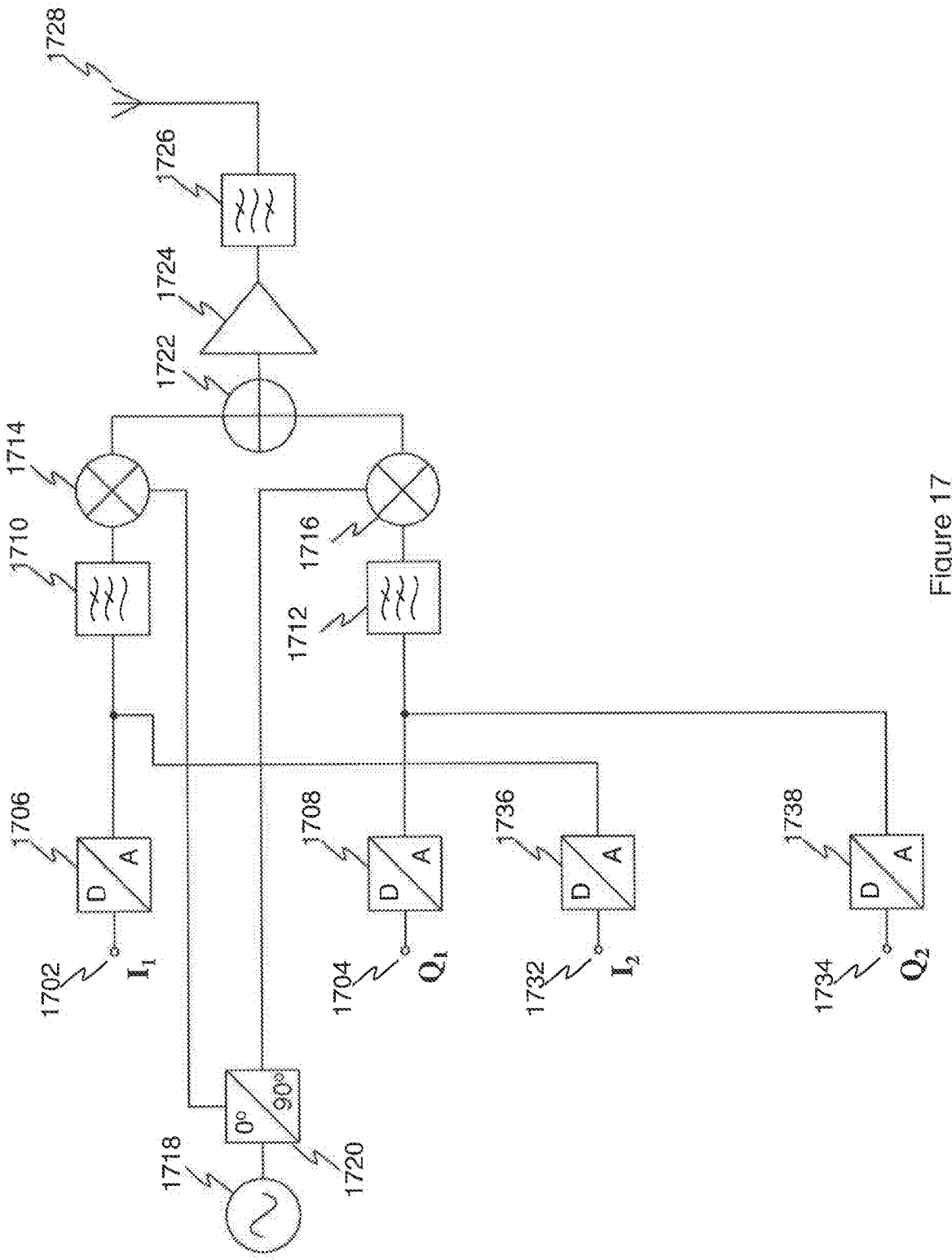
FIG. 17 schematically illustrates an exemplary transmitter according to embodiments of the disclosure wherein filter hardware is shared between the two transmitter paths.

FIG. 17 schematically illustrates a transmitter according to an embodiment wherein filter hardware is shared between the two transmitter paths. The operation of DACs 1706, 1708, 1736 and 1738; mixers 1714 and 1716; local oscillator 1718; quadrature generator 1720; summing point 1722; power amplifier 1724; duplex filter 1726; and antenna 1728; are the same as described previously in relation to FIG. 15. However, the fork between the first and second transmitter paths is now positioned before the input to low-pass filters 1710 and 1712. Hence, low-pass filter 1710 now isolates the combined I components of both signals from any unwanted higher frequencies, and low-pass filter 1712 now isolates the combined Q components of both signals from any unwanted higher frequencies. To achieve this, the corner frequency of low pass filters must be configured higher, to allow the isolation of a higher aggregate signal bandwidth. As a result of sharing additional hardware components between the two transmitter paths, additional power consumption and silicon area cost savings can be made.

Figure 18:
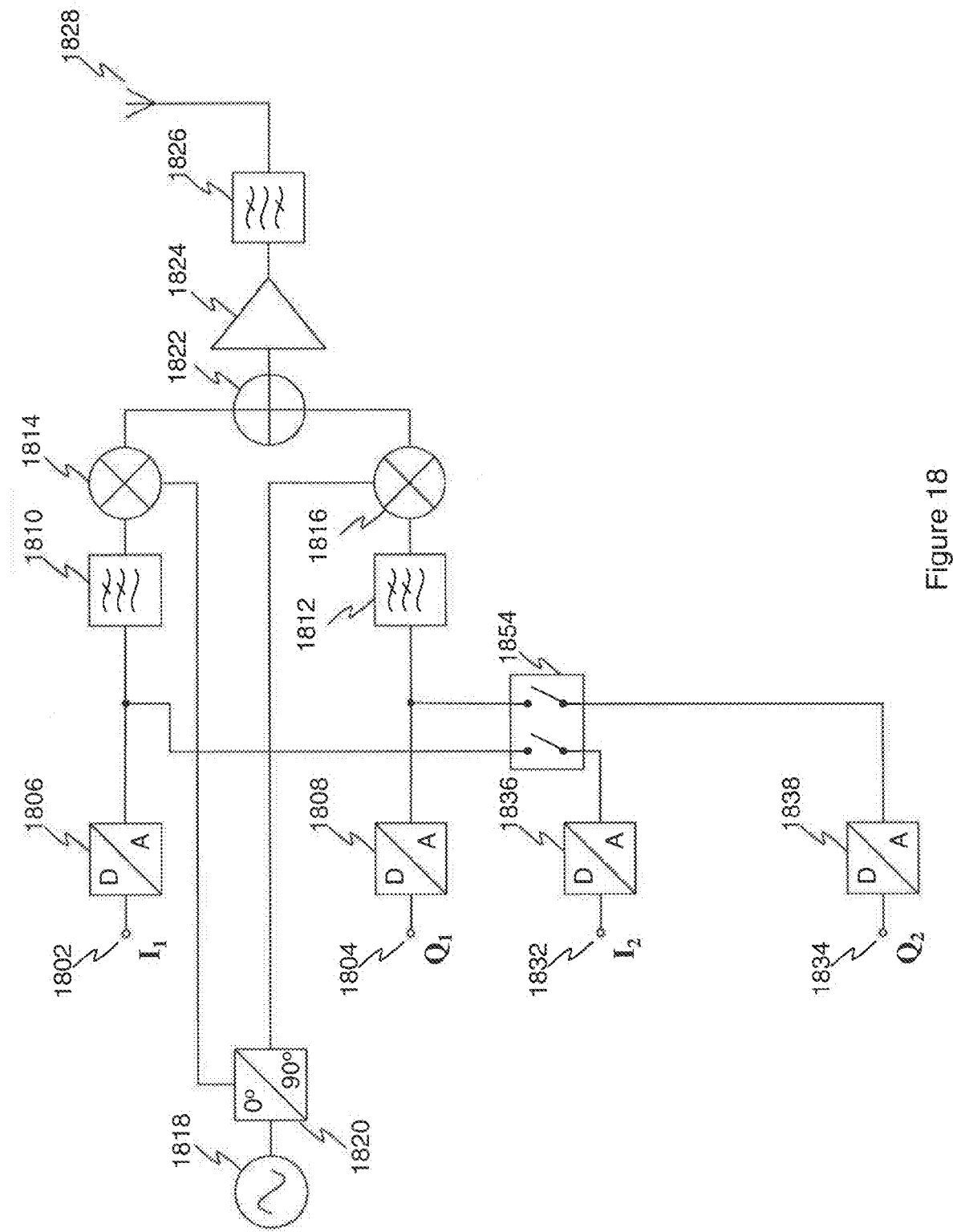
FIG. 18 schematically illustrates an exemplary transmitter according to embodiments of the disclosure wherein filter hardware is shared between the two transmitter paths and the second transmitter path may be configured into an inoperative state.

FIG. 18 schematically illustrates a further transmitter according to an embodiment, wherein mixer hardware is shared between the two transmitter paths and the second transmitter path may be configured into an inoperative state. The operation of DACs 1806, 1808, 1836 and 1838; low-pass filters 1810 and 1812; mixers 1814 and 1816; local oscillator 1818; quadrature generator 1820; summing point 1822; power amplifier 1824; duplex filter 1826; and antenna 1828; are the same as described previously in relation to FIG. 17.

In this arrangement, switching hardware 1854 has been introduced on the second transmitter path just before the fork between the first and second transmitter paths, resulting in the fork between the first and second transmitter paths comprising two channels. The operation of switching hardware 1854 is analogous to that described in relation to FIG. 16.

As a further alternative, if the resolution of the DACs are sufficiently high, it may be possible to perform the signal combination in the digital domain and hence the fork and filtering arrangements can be moved entirely into the pre-processing stages.

It is to be noted that, depending on the up-conversion mixer topologies, the interface between the various components can be configured in ways other than those shown in FIGS. 9 and 14-18. For example, in embodiments that utilise mixers comprising multiple stages, the signals may be combined between two of the mixer stages. Further, the filters shown in FIGS. 9 and 1448 may be alternatively arranged between mixer stages, or additional filtering or amplification components may be deployed between mixer stages.

While the above embodiments relate to Carrier Aggregation for Long Term Evolution (LTE), it will be appreciated that the present disclosure applies to Carrier Aggregation for other, different, radio access technologies such as the aforementioned or High Speed packet. Access (HSPA) Furthermore, the present disclosure applies to intra-band Carrier Aggregation, in which a user equipment transmits carrier frequencies to radio access nodes operating in accordance with different radio access technologies, such as is the case for intra-band HSPA-LTE Carrier Aggregation.

In various embodiments an apparatus is provided comprising the aforementioned transmitter hardware, such as a user terminal, or one or more components thereof such as for example a wireless modem configured for use in a user terminal.

Figure 19:
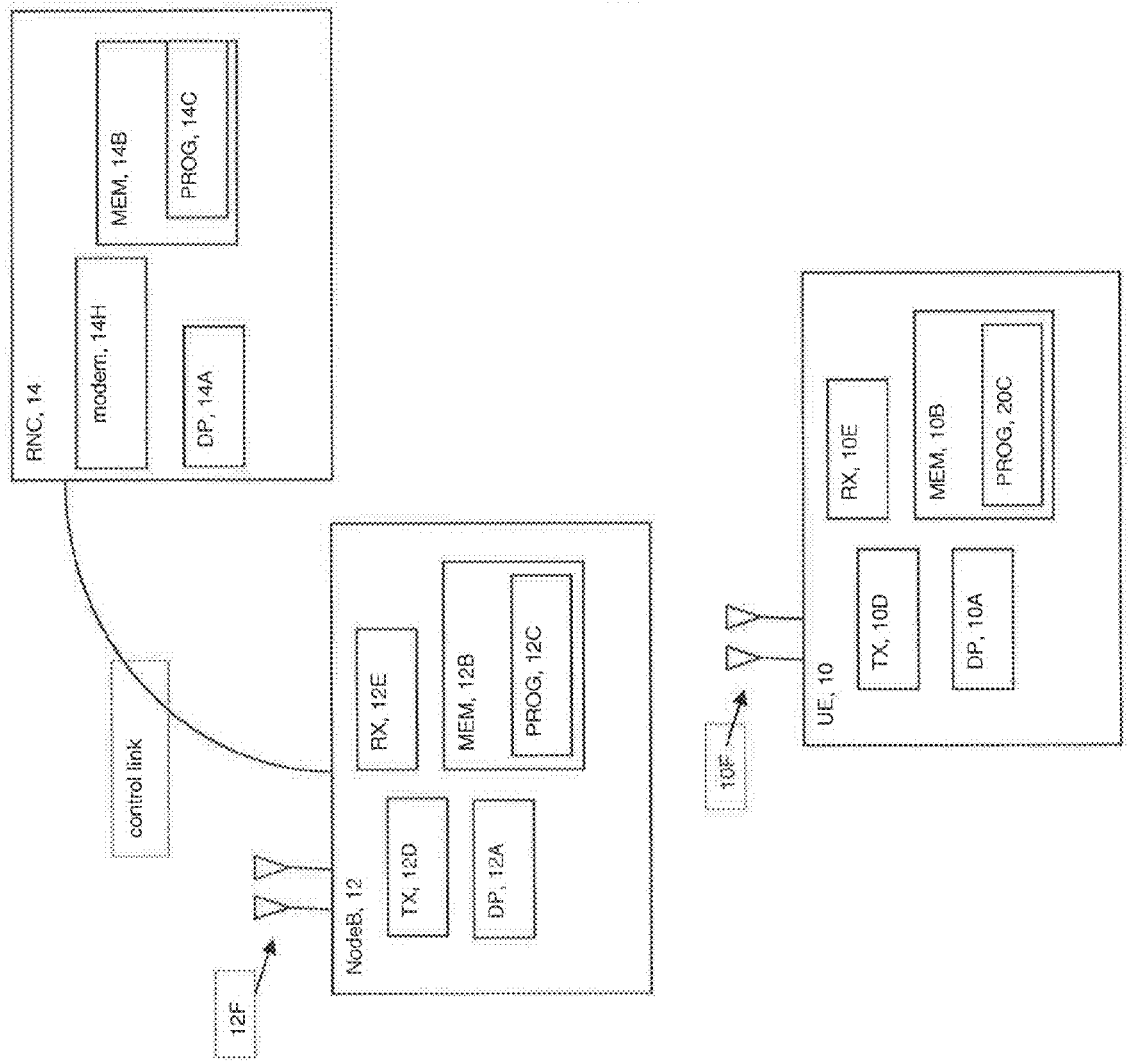
FIG. 19 is a simplified block diagram of various network devices and a user terminal which may include the transmitter hardware shown in FIGS. 9 and 14-18.

Reference is now made to FIG. 19 for illustrating a simplified block diagram of various electronic devices and apparatus that are suitable for use in practicing exemplary embodiments. In FIG. 19 a serving cell/network access node 12 is adapted for communication over a wireless link with a mobile apparatus, such as a mobile terminal or UE 10. The network access node 12 may be a NodeB as identified at FIG. 12, an eNodeB (of an E-UTRAN system), an access point AP, a remote radio head or relay station, or other type of base station/cellular access node.

The UE 10 includes processing means such as at least one data processor (DP) 10A, storing means such as at least one computer-readable memory (MEM) 10B storing at least one computer program (PROG) 10C, and also communicating means such as a receiver RX 10E and a transmitter TX 10D configured according to embodiments for bidirectional wireless communications with the network access node 12 via one or more antennas 10F.

The network access node 12 similarly includes processing means such as at least one data processor (DP) 12A, storing means such as at least one computer-readable memory (MEM) 12B storing at least one computer program (PROG) 12C, and communicating means such as a transmitter TX 12D and a receiver RX 12E for bidirectional wireless communications with the UE 10 via one or more antennas 12F. The RNC 14 represents any other higher network node or serving gateway providing connectivity to a broader network (a publicly switched telephone network or the Internet for example), and some systems may not have such a higher network node between the access node 12 and the Internet.

Similarly, the RNC 1.4 includes processing means such as at least one data processor (DP) 14A, storing means such as at least one computer-readable memory (MEM) 14B storing at least one computer program (PROG) 14C, and communicating means such as a modem 14H for bidirectional communication with the network access node 12 via the control link.

It will be understood that the various embodiments of the transmitter 10E described herein comprise circuitry that may be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of the aforementioned components, including control circuitry, digital signal processor or processors, baseband circuitry and radio frequency circuitry, which are configurable so as to operate in accordance with the exemplary embodiments. In this regard, the exemplary embodiments may be implemented at least in part by computer software stored in memory and executable by a processor, or by hardware, or by a combination of tangibly stored software and hardware (and tangibly stored firmware).

Figure 20:
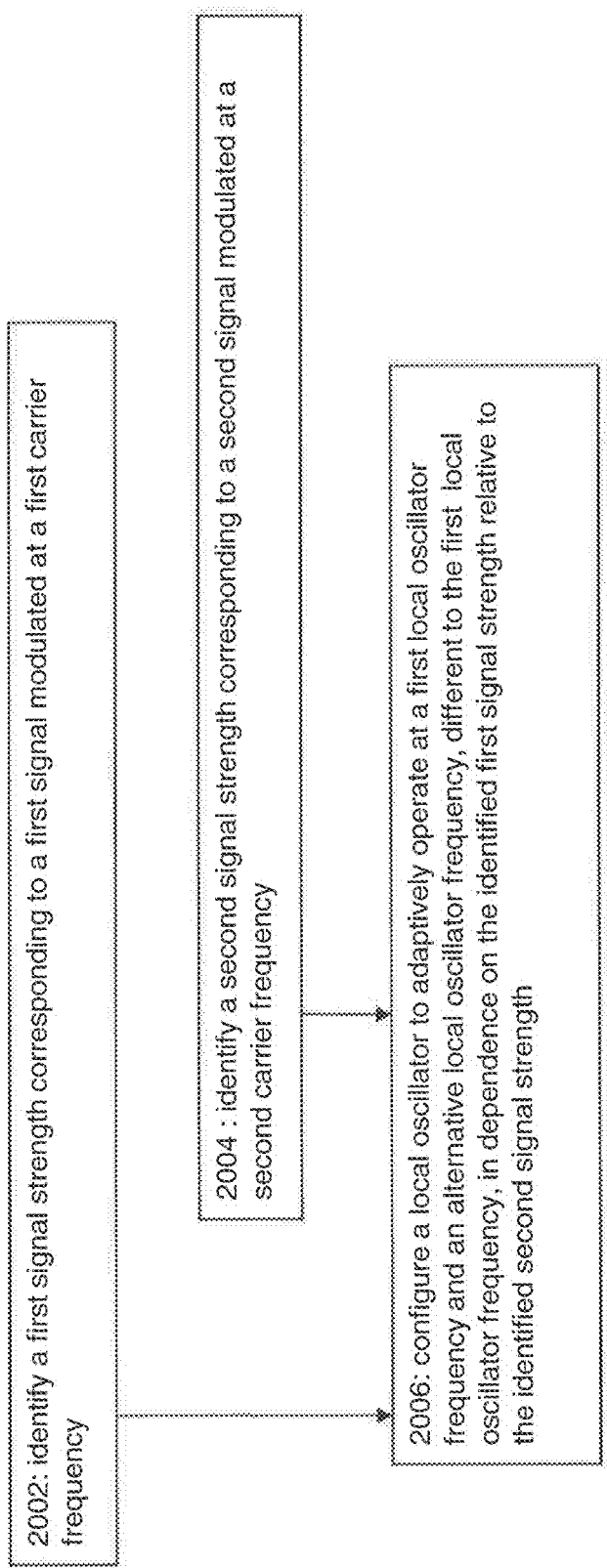
FIG. 20 is a logic, flow diagram that illustrates the steps involved in configuring a transmitter according to an embodiment of the disclosure.

FIG. 20 is a logic flow diagram that describes an exemplary embodiment from the perspective of the UE 10, and in this regard, the Figure represents steps performed by one or a combination of the aforementioned control circuitry, digital signal processor or processors, baseband circuitry and radio frequency circuitry.

At step 2002, the transmitter apparatus identifies a first required signal strength corresponding to a first signal to be transmitted to the access point 12, this being a signal modulated at a first carrier frequency. At step 2004, the transmitter apparatus identifies a second required signal strength corresponding to a second signal also to be transmitted to the access point 12, this being a signal modulated at a second carrier frequency, different to the first carrier frequency. Then, at step 2006, the transmitter apparatus configures a local oscillator to adaptively operate at a first local oscillator frequency and an alternative local oscillator frequency, different to the first local oscillator frequency, in dependence on the identified required first signal strength relative to the identified required second signal strength.

As will be appreciated from the foregoing detailed description, according to some embodiments, the transmitter is further arranged to perform a comparison operation comprising comparing a difference between the required signal strength of said first signal and the required signal strength of said second signal to a predetermined threshold amount, whereby to generate an output indicative of similarity between the required signal strength of said first signal and the required signal strength of said second signal. This allows the threshold level to be adapted in order to vary the level of similarity of the signal strengths required to alter the output of the comparison operation.

Preferably, the local oscillator is configured to operate at said first local oscillator frequency when the output of said comparison operation indicates that the required signal strength of said first signal and the required signal strength of said second signal are substantially similar. In this way, the transmitter can be configured to operate as a low IF transmitter for both carrier signals when the required signal strengths of the two signals are similar enough to allow effective transmission of both signals using such an arrangement.

Preferably, the local oscillator is configured to operate at said alternative local oscillator frequency when the output of said comparison operation indicates that the required signal strength of said first signal and the required signal strength of said second signal are dissimilar. Hence, the transmitter can be configured to change the local oscillator frequency to the carrier frequency of one of the signals when the signal strengths of the two signals are not sufficiently similar to allow effective transmission of both of the signals using a single transmitter path configured to operate as a low-IF transmitter for both carriers. In this case, one carrier signal is transmitted using a low-IF transmitter path and the other carrier is transmitted using a direct conversion transmitter path.

The predetermined threshold amount can be defined relative to the required signal strength of one or both of said first signal and said second signal. When both signal strengths are low, this enables a lower absolute difference between the signal strengths of the two signals to be used to trigger a change in the frequency produced by the local oscillator, thereby providing a better reflection of the efficacy of using a single transmitter path to transmit both signals.

According to further embodiments, the transmitter comprises a first transmitter path and a second transmitter path, said second transmitter path having a plurality of operating modes, including an inoperative mode. Hence, when operating in the inoperative mode, a portion of the transmitter can be disabled in order to reduce the power consumption of the transmitter.

The local oscillator can be directly connected to the first transmitter path and to the second transmitter path and configured to operate at one of said first local oscillator frequency and said alternative local oscillator frequency in dependence on the output of said comparison operation. By using a single local oscillator for both transmitter paths, the effect of local oscillator pulling due to the physical proximity of more than one oscillator generating a similar frequency is avoided. Further, the complexity and silicon area cost associated with the transmitter is reduced.

According to some arrangements, the transmitter further comprises one or more frequency mixers, at least one said frequency mixer being shared between said first transmitter path and said second transmitter path. As a result of sharing a local oscillator, frequency mixers can be shared between the two transmitter paths in order to further reduce complexity and silicon area costs.

The transmitter may comprise a switch arranged to configure the operating mode of said second transmitter path to the inoperative mode, in dependence on the output of said comparison operation. This enables selective blocking of the second transmitter path from the shared hardware components, and as a result the power consumption of the transmitter can be reduced by removing transient or switching losses associated with the signal generated by the second path while in the inoperative mode.

According to some arrangements, the switch is configured to selectively block said second transmitter path from the input to said shared frequency mixer, whereby to configure the second transmitter path into said inoperative mode. By locating the switching hardware before one input to a shared mixer, a trade off can be made between the reduced cost of the single mixer stage and the increased cost of duplicated switching hardware.

The transmitter may be configured to selectively isolate said second transmitter path from an electrical power source, whereby to configure the second transmitter path into the inoperative mode, in dependence on the output of said comparison operation. By removing power from the second transmitter path when it is inoperative, the baseline power consumption associated with the second transmitter path can be reduced. This provides further power savings.

In some embodiments, in the event that the operating mode of the second transmitter path is an operative mode, the transmitter is arranged to adaptively alter a first gain associated with the first transmitter path, and to adaptively alter a second gain associated with the second transmitter path in dependence on the required signal strength of the first signal and the required signal strength of the second signal. Hence the required difference in the signal strengths of the two signals can be achieved by the independently configurable gains of each path after the signals are converted into the analogue domain, thereby allowing the DACs to use their full dynamic range and minimising quantisation artefacts.

The first transmitter path may comprise a low pass filter for isolating said first and second signals, and said second transmitter path may comprise a band pass filter for isolating the other of said first or second signals. As the signals are synthesised at different frequencies, different filter profiles are required to isolate them.

Preferably, one or more of an antenna, a radio-frequency amplifier, a power amplifier and a radio-frequency filter are shared between said first transmitter path and said second transmitter path. As further advantage of using the same local oscillator signal for both transmitter paths, emission end hardware which is typically optimised for a specific range of inputs and operating frequencies may be shared between the two transmitter paths, thereby further reducing hardware costs.

Preferably, said first local oscillator frequency is substantially halfway between said first carrier frequency and said second carrier frequency. Hence, when the required signal strengths of the two signals are similar, the signals can be generated using a single transmitter path acting as a low-IF transmitter for both signals.

According to some arrangements, the alternative local oscillator frequency is determined in dependence on the required signal strength of the first signal relative to the required signal strength of the second signal. Preferably the alternative local oscillator frequency is configured to a first alternative local oscillator frequency value when the required signal strength of the first signal is lower than the required signal strength of the second signal, and a second alternative local oscillator frequency value when the required signal strength of the first signal is higher than the required signal strength of the second signal. Hence the decision of which operating method to use can be made to ensure that the second transmitter path always generates the higher or lower powered signal, thereby allowing component selection for the second transmitter path to be optimised for such conditions or the minimisation of out-of-band emissions.

According to some arrangements, the alternative local oscillator frequency is determined in dependence on the carrier frequency of a third signal, associated with one or more of said first signal and said second signal, modulated at a third carrier frequency. Preferably, the alternative local oscillator frequency is configured to a first alternative local oscillator frequency value when said third carrier frequency is higher than one of said first and second carrier frequencies, and a second alternative local oscillator frequency value when said third carrier frequency is lower than one of said first and second carrier frequencies. Hence the decision of which operating method to use can be made to ensure that the second transmitter path always generates the signal having carrier frequency that is closest to a corresponding downlink channel, thereby minimising the effect of noise generated by the transmitter operation on that channel.

In some embodiments, said first alternative local oscillator frequency value is substantially the same as said first carrier frequency, and said second alternative local oscillator frequency value is substantially the same as said second carrier frequency. In alternative embodiments, said first alternative local oscillator frequency value is substantially the same as said second carrier frequency and the second alternative local oscillator frequency value is substantially the same as said first carrier frequency.

Preferably, first carrier frequency and said second carrier frequency are associated with adjacent channels in a communication scheme associated with one or more of said first signal and said second signal. Hence, the complexity of the transmitter and any shared emission end hardware can be minimised as a narrower range of radio frequencies need to be simultaneously transmitted. In situations that require the use of a second transmitter path, the low frequency at which the associated signal must be synthesised is also advantageously lowered.

The above embodiments are to be understood as illustrative examples and further embodiments are envisaged. For example, communication schemes other than LTE-A may be used, in any scenario where two signals with similar carrier frequencies need to be transmitted simultaneously. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A transmitter for transmitting data the transmitter comprising:
    a local oscillator,
    the transmitter being configured to modulate a first signal including one data stream at a first carrier frequency, modulate a second signal including another data stream at a second carrier frequency that is different than the first carrier frequency, and transmit a combination of the first signal modulated at the first carrier frequency and the second signal modulated at the second carrier frequency, and
    the transmitter being further configured to identify a required signal strength of the first signal and to identify a required signal strength of the second signal, and
    the transmitter being further configured to, establish an output indicative of a similarity between the required signal strength of the first signal and the required signal strength of the second signal, selecting between a first local oscillator frequency and an alternative local oscillator frequency different than the first local oscillator frequency based upon said output indicative of a similarity.

2. A transmitter according to claim 1, wherein the transmitter is further configured to perform a comparison operation comprising comparing a difference between the required signal strength of said first signal and the required signal strength of said second signal to a predetermined threshold amount, whereby an output indicative of similarity between the required signal strength of said first signal and the required signal strength of said second signal is generated based on said comparison operation.

3. A transmitter according to claim 2, wherein said local oscillator is configured to operate at said first local oscillator frequency when the output of said comparison operation indicates that the required signal strength of said first signal and the required signal strength of said second signal are substantially similar.

4. A transmitter according to claim 2, wherein said local oscillator is configured to operate at said alternative local oscillator frequency when the output of said comparison operation indicates that the required signal strength of said first signal and the required signal strength of said second signal are dissimilar.

5. A transmitter according to claim 2, wherein the predetermined threshold amount is defined relative to the required signal strength of one or both of said first signal and said second signal.

6. A transmitter according to claim 2, comprising a first transmitter path and a second transmitter path, said second transmitter path having a plurality of modes, including an inoperative mode and at least one operative mode.

7. A transmitter according to claim 6, wherein said local oscillator is directly connected to the first transmitter path and to the second transmitter path and configured to operate at one of said first local oscillator frequency and said alternative local oscillator frequency in dependence on the output of said comparison operation.

8. A transmitter according to claim 6, further comprising at least one frequency mixer, said at least one frequency mixer being shared between said first transmitter path and said second transmitter path.

9. A transmitter according to claim 6 comprising a switch configured to switch the mode of said second transmitter path to the inoperative mode, in dependence on the output of said comparison operation.

10. A transmitter according to claim 9, wherein the switch is further configured to selectively block said second transmitter path from the input to said shared frequency mixer, and thereby place the second transmitter path into the inoperative mode.

11. A transmitter according to claim 6 wherein said transmitter is further configured to selectively isolate said second transmitter path from an electrical power source, and thereby place the second transmitter path into the inoperative mode, in dependence on the output of said comparison operation.

12. A transmitter according to claim 6, wherein, in the event that the mode of the second transmitter path is an operative mode, the transmitter is further configured to adaptively alter a first gain associated with the first transmitter path, and to adaptively alter a second gain associated with the second transmitter path in dependence on the required signal strength of the first signal and the required signal strength of the second signal.

13. A transmitter according to claim 6, wherein said first transmitter path comprises a low pass filter for selecting one of said first and second signals, and said second transmitter path comprises a band pass filter for selecting the other of said first and second signals.

14. A transmitter according to claim 1, wherein said first local oscillator frequency is substantially halfway between said first carrier frequency and said second carrier frequency.

15. A transmitter according to claim 1, wherein said alternative local oscillator frequency is determined in dependence on the relationship between the required signal strength of the first signal and the required signal strength of the second signal.

16. A transmitter according to claim 15, wherein said alternative local oscillator frequency is configured to a first alternative local oscillator frequency value when the required signal strength of said first signal is lower than the required signal strength of said second signal, and a second alternative local oscillator frequency value when the required signal strength of said first signal higher than the required signal strength of said second signal.

17. A transmitter according to claim 1, wherein said alternative local oscillator frequency is determined in dependence on the carrier frequency of a third signal modulated at a third carrier frequency, said third signal being associated with one or more of said first signal and said second signal.

18. A transmitter according to claim 17, wherein said alternative local oscillator frequency is configured to a first alternative local oscillator frequency value when said third carrier frequency is higher than one of said first and second carrier frequencies, and a second alternative local oscillator frequency value when said third carrier frequency is lower than one of said first and second carrier frequencies.

19. A transmitter according to claim 1 wherein said first carrier frequency and said second carrier frequency are associated with adjacent channels in a communication scheme associated with one or more of said first signal and said second signal.

20. A method of configuring a transmitter to transmit data the method comprising:
    modulating a first signal including one data stream at a first carrier frequency;
    modulating a second signal including another data stream at a second carrier frequency that is different than the first carrier frequency;
    transmitting a combination of the first signal modulated at the first carrier frequency and the second signal modulated at the second carrier frequency;
    identifying a first required signal strength corresponding to the first signal;
    identifying a second required signal strength corresponding to the second signal; and
    establishing an output indicative of a similarity between the first required signal strength of the first signal and the second required signal strength of the second signal, selecting between a first local oscillator frequency and an alternative local oscillator frequency different than the first local oscillator frequency based upon said output indicative of a similarity.

21. A transmitter for transmitting data via a combination of a first signal modulated at a first carrier frequency, and a second signal modulated at a second carrier frequency different than the first carrier frequency, the transmitter comprising:

a local oscillator, the transmitter being configured to identify a required signal strength of the first signal and to identify a required signal strength of the second signal, the transmitter being further configured to, establish an output indicative of a similarity between the required signal strength of the first signal and the required signal strength of the second signal, selecting between a first local oscillator frequency and an alternative local oscillator frequency different than the first local oscillator frequency based upon said output indicative of a similarity, and the transmitter being further configured to perform a comparison operation comprising comparing a difference between the required signal strength of the first signal and the required signal strength of the second signal to a predetermined threshold amount, whereby the output indicative of similarity between the required signal strength of the first signal and the required signal strength of the second signal is generated based on the comparison operation.

22. A transmitter according to claim 21, wherein the local oscillator is configured to operate at the first local oscillator frequency when the output of the comparison operation indicates that the required signal strength of the first signal and the required signal strength of the second signal are substantially similar.

23. A transmitter according to claim 21, wherein the local oscillator is configured to operate at the alternative local oscillator frequency when the output of the comparison operation indicates that the required signal strength of the first signal and the required signal strength of the second signal are dissimilar.

24. A transmitter according to claim 21, wherein the predetermined threshold amount is defined relative to the required signal strength of one or both of the first signal and the second signal.

25. A transmitter according to claim 21, comprising a first transmitter path and a second transmitter path, the second transmitter path having a plurality of modes, including an inoperative mode and at least one operative mode.

26. A transmitter according to claim 25, wherein the local oscillator is directly connected to the first transmitter path and to the second transmitter path and configured to operate at one of the first local oscillator frequency and the alternative local oscillator frequency in dependence on the output of the comparison operation.

27. A transmitter according to claim 25, further comprising at least one frequency mixer, the at least one frequency mixer being shared between the first transmitter path and the second transmitter path.

28. A transmitter according to claim 25 comprising a switch configured to switch the mode of the second transmitter path to the inoperative mode, in dependence on the output of the comparison operation.

29. A transmitter according to claim 28, wherein the switch is further configured to selectively block the second transmitter path from the input to the shared frequency mixer, and thereby place the second transmitter path into the inoperative mode.

30. A transmitter according to claim 25, wherein the transmitter is further configured to selectively isolate the second transmitter path from an electrical power source, and thereby place the second transmitter path into the inoperative mode, in dependence on the output of the comparison operation.

31. A transmitter according to claim 25, wherein, when the mode of the second transmitter path is an operative mode, the transmitter is further configured to adaptively alter a first gain associated with the first transmitter path, and to adaptively alter a second gain associated with the second transmitter path in dependence on the required signal strength of the first signal and the required signal strength of the second signal.

32. A transmitter according to claim 25, wherein the first transmitter path comprises a low pass filter for selecting one of the first and second signals, and the second transmitter path comprises a band pass filter for selecting the other of the first and second signals.

* * * * *